(12) United States Patent
Yamamoto et al.

(10) Patent No.: US 12,706,502 B2
(45) Date of Patent: Aug. 11, 2026

(54) ARMATURE AND MOTOR

(71) Applicant: DENSO CORPORATION, Kariya-city (KR)

(72) Inventors: Toshio Yamamoto, Kariya-city (JP); Yuji Hayashi, Kariya-city (JP); Yusuke Tateishi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 18/616,546

(22) Filed: Mar. 26, 2024

(65) Prior Publication Data

US 2024/0235311 A1 Jul. 11, 2024

Related U.S. Application Data

(63) Continuation of application No. PCT/JP2022/026641, filed on Jul. 4, 2022.

(30) Foreign Application Priority Data

Sep. 27, 2021 (JP) ................................ 2021-156910

(51) Int. Cl.
*H02K 3/47* (2006.01)
*H02K 1/278* (2022.01)
*H02K 21/14* (2006.01)

(52) U.S. Cl.
CPC ............... *H02K 3/47* (2013.01); *H02K 1/278* (2013.01); *H02K 21/14* (2013.01); *H02K 2203/12* (2013.01)

(58) Field of Classification Search
CPC ........... H02K 3/34; H02K 3/345; H02K 3/47; H02K 3/522; H02K 1/04; H02K 15/10; H02K 15/106
See application file for complete search history.

(56) References Cited

U.S. PATENT DOCUMENTS

2018/0115227 A1* 4/2018 Kim ...................... H02K 1/146
2021/0384808 A1* 12/2021 Tamura ................. H02K 1/278

FOREIGN PATENT DOCUMENTS

JP H11-187590 A 7/1999
JP 2001-359251 A 12/2001
(Continued)

OTHER PUBLICATIONS

JP-2003309944-A Machine Translation (Year: 2003).*

*Primary Examiner* — Oluseye Iwarere
*Assistant Examiner* — Masoud Vaziri
(74) *Attorney, Agent, or Firm* — Oliff PLC

(57) ABSTRACT

A stator includes an armature core having an annular shape, coils, and an insulator. The coils are arranged along the armature core. Each of the coils is a wound conductive winding. Each of the coils includes a pair of facing portions disposed to be aligned in a circumferential direction with a predetermined interval therebetween. The first and second facing portions of each of the coils constitute intermediate portions of the corresponding one of the coils. Each of the coils includes a pair of first and second coil end portions that link the facing portions to each other. The insulator is arranged between the stator core and the coils. The insulator includes a base comprised of an insulating material, and one or more soft-magnetic members each being comprised of a soft-magnetic material, the one or more soft-magnetic members being contained in the base.

8 Claims, 31 Drawing Sheets

(56) References Cited

FOREIGN PATENT DOCUMENTS

| | | | | |
|---|---|---|---|---|
| JP | 2003309944 | A | * | 10/2003 |
| JP | 2011-176982 | A | | 9/2011 |
| JP | 2017-189010 | A | | 10/2017 |

* cited by examiner 12 76 B C 28 36(16) 24 28 18 14 36(16) B 36(16) 28 36(16) 26 28 R

ARMATURE AND MOTOR

CROSS REFERENCE TO RELATED APPLICATION

This application is a bypass continuation application of currently pending international application No. PCT/JP2022/026641 filed on Jul. 4, 2022 designating the United States of America, the entire disclosure of which is incorporated herein by reference, the international application being based on and claiming the benefit of priority from Japanese Patent Application No. 2021-156910 filed on Sep. 27, 2021, the disclosure of which is incorporated in its entirety herein by reference.

TECHNICAL FIELD

The present disclosure relates to armatures and motors.

BACKGROUND

Japanese Patent Application Publication No. 2011-176982 discloses a slot-less motor including a stator and a rotor.

The stator includes an annular core, a plurality of outside coils mounted to the inner periphery of the annular core, and a plurality of outside coils mounted to the inner periphery of the annular core. The rotor includes a plurality of permanent magnets mounted to the outer periphery thereof. The rotor is coaxially arranged to face the stator with a gap therebetween. The stator of the slot-less motor disclosed in the patent publication includes a substantially tubular cylindrical insulator comprised of a ring body. The ring body of the insulator has formed therein slots partitioned from each other. The slots are divided into a first group of slots and a second group of slots. The outer peripheral wall of the ring body of the insulator has formed therethrough openings communicating with the respective slots of the first group, and the inner peripheral wall of the ring body of the insulator has formed therethrough openings communicating with the respective slots of the second group; the slots of the first group and the slots of the second group are alternately arranged in the circumferential direction of the insulator. Each outside coil is wound to surround a corresponding one of the slots while passing through the at least one opening communicating with a corresponding at least one of the slots of the first group. Each inside coil is wound to surround a corresponding one of the slots of the second group while passing through the at least one opening communicating with a corresponding at least one of the slots of the second groups. This facilitates the procedure of manufacturing the stator with wider coil spans.

SUMMARY

The insulator of the slot-less motor disclosed in the patent publication does not contribute to or contributes less to torque generated by the rotor. This may result in the motor disclosed in the patent publication leaving much room for improvement of torque without an increase in size.

From this viewpoint, the present disclosure seeks to provide armatures and motors, each of which is capable of improving torque without an increase in size.

A first exemplary aspect of the present disclosure provides an armature for addressing such a problem set forth above. The armature includes an armature core having an annular shape, and a plurality of coils arranged along the armature core. Each of the coils is a wound conductive winding. Each of the coils includes a pair of facing portions disposed to be aligned in a circumferential direction with a predetermined interval therebetween. The first and second facing portions of each of the coils constitute intermediate portions of the corresponding one of the coils. Each of the coils includes a pair of first and second coil end portions that link the facing portions to each other. The armature includes an insulator arranged between the stator core and the coils. The insulator includes a base comprised of an insulating material, and one or more soft-magnetic members each being comprised of a soft-magnetic material. The one or more soft-magnetic members are contained in the base.

A motor includes the armature.

This configuration enables the armature and the motor to improve torque without an increase in size.

BRIEF DESCRIPTION OF THE DRAWINGS

Other aspects of the present disclosure will become apparent from the following description of embodiments with reference to the accompanying drawings in which:

FIG. 30 is an enlarged transverse sectional view illustrating a part of a stator and a part of a rotor according to the thirteenth embodiment;

DETAILED DESCRIPTION OF EMBODIMENT

First Embodiment

The following describes a motor 10 according to the first embodiment of the present disclosure with reference to FIGS. 1 to 13. An arrow direction Z shown in selected ones of the figures represents a first side of an axial direction of the rotor 12 around which the rotor 12 rotates, an arrow direction R shown in selected ones of the figures represents an outward radial direction of the axial direction, and an arrow direction C represents a first side of a circumferential direction around the axial direction. The axial direction simply described hereinafter represents the axial direction of the rotor 12 unless otherwise noted, radial directions simply described hereinafter represent the corresponding radial directions of the rotor 12 unless otherwise noted, and the circumferential direction simply described hereinafter represents the circumferential direction of the rotor 12 unless otherwise noted.

Figure 1:
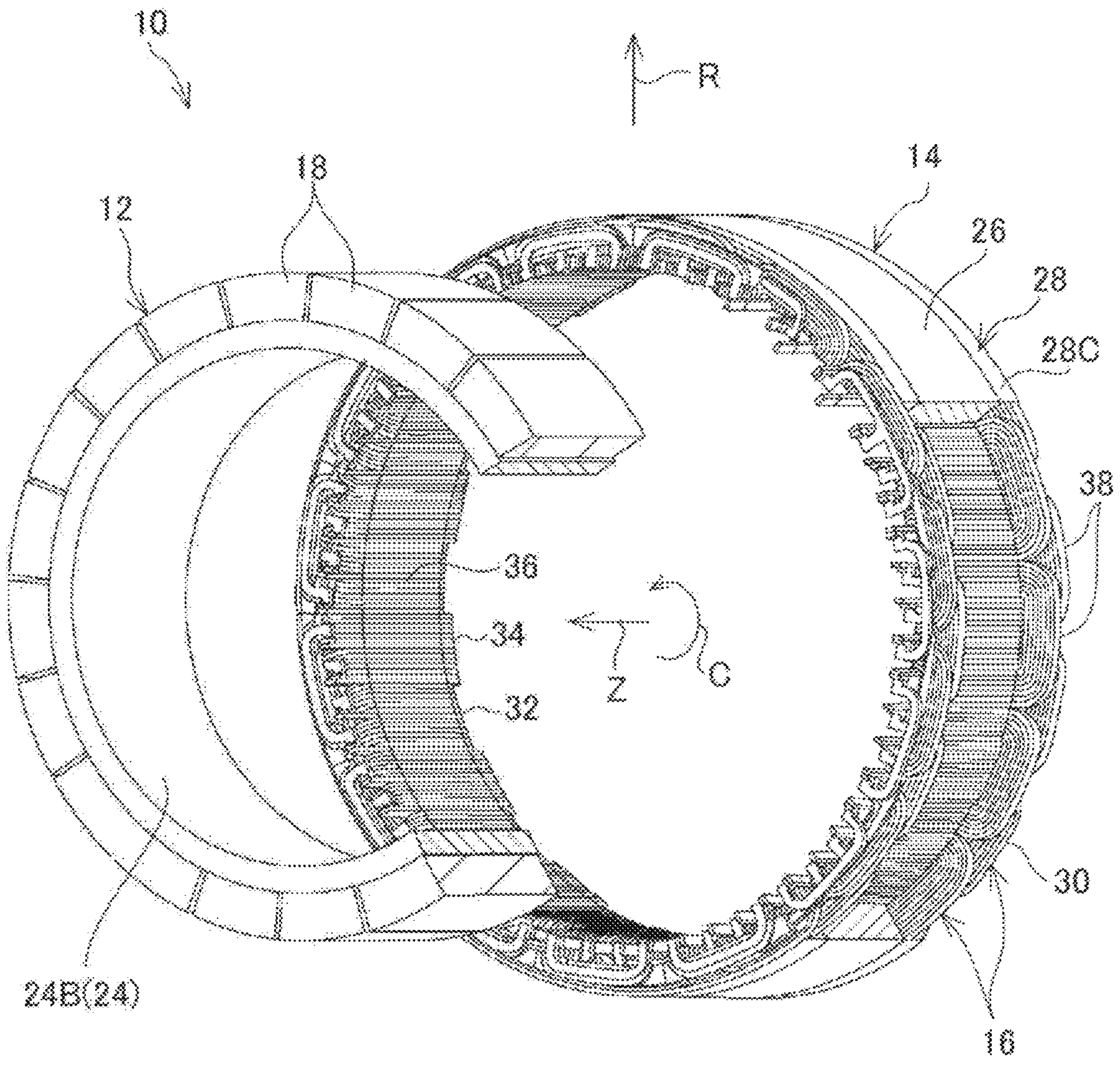
FIG. 1 is a partially cross-sectional perspective view illustrating a rotor and a stator of a motor according to the first embodiment.
Figure 2:
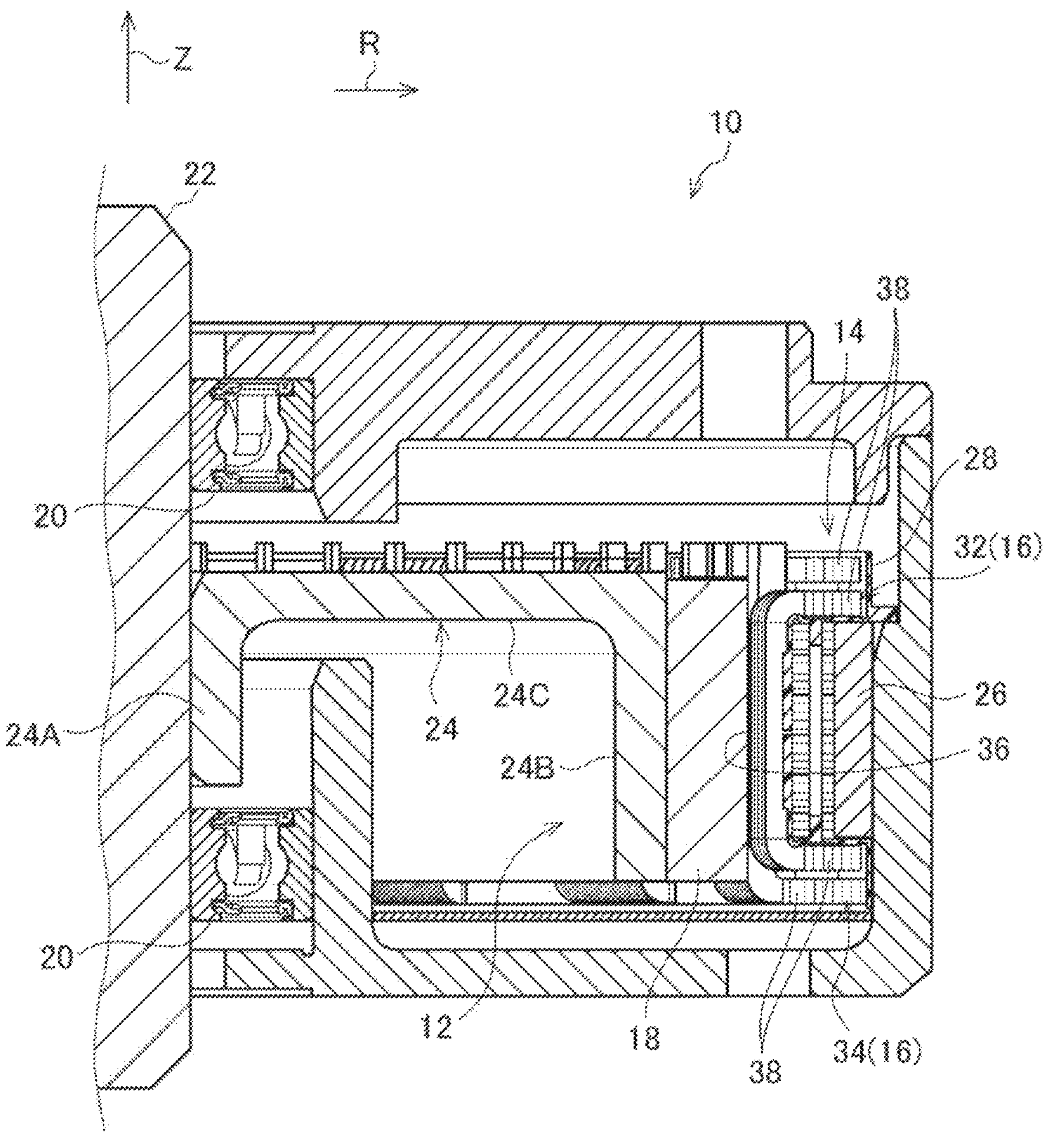
FIG. 2 is an axial sectional view of the motor in an axial direction thereof.
Figure 3:
FIG. 3 is a plan view illustrating the stator and the rotor.
Figure 3:
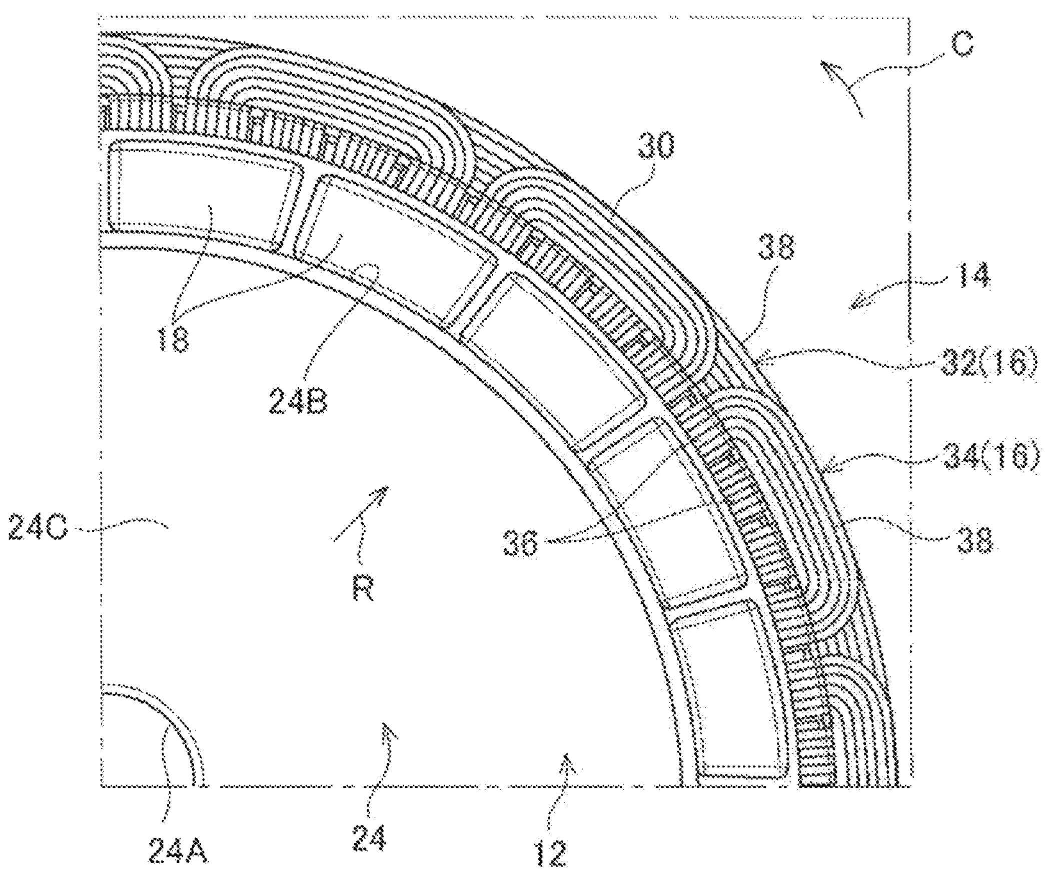
Figure 4:
FIG. 4 is a transverse sectional view of the stator and the rotor.
Figure 4:
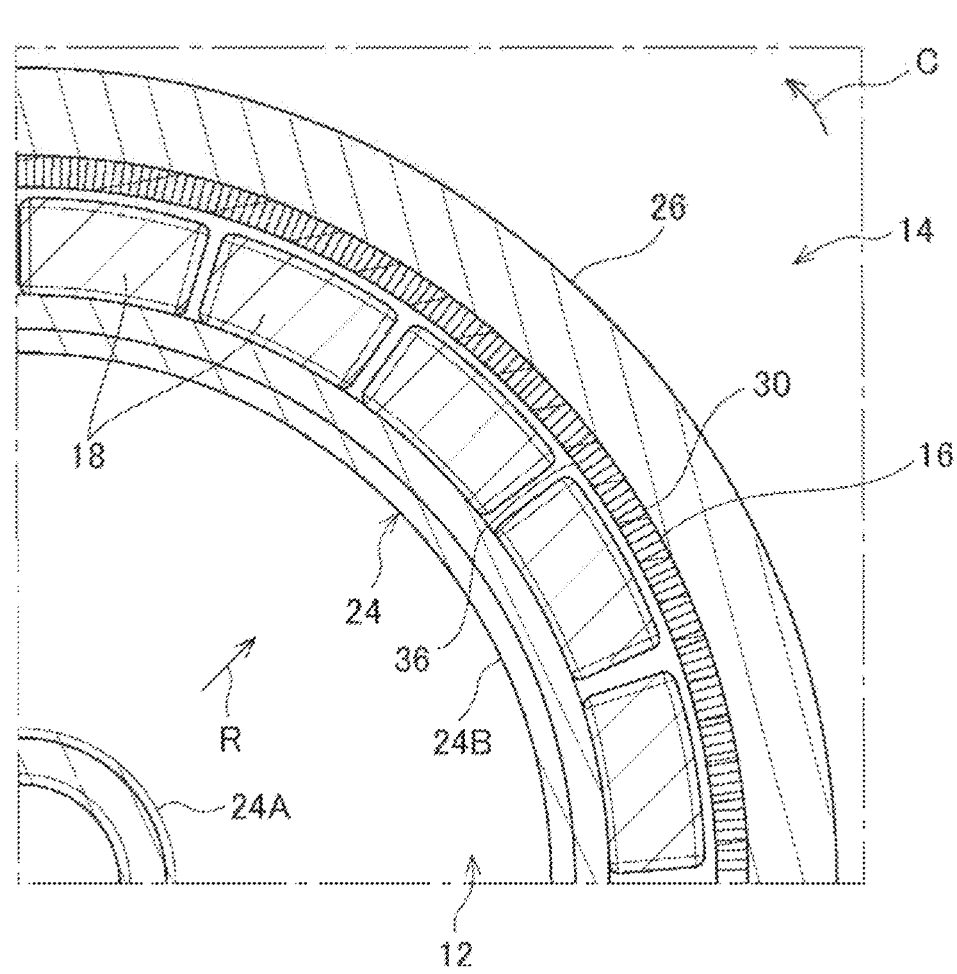

As illustrated in FIGS. 1 to 3, the motor 10 of the first embodiment is configured as an inner-rotor brushless motor that includes a rotor 12 and a stator 14 serving as an armature; the rotor 12 is arranged radially inside the stator 14. FIGS. 1 to 5 illustrates an exemplary configuration of the motor 10. The number of coils 16, the number of magnets 18, and the shapes of details of the motor 10 illustrated in FIGS. 1 to 5 may be different from those described hereinafter.

The rotor 12 includes a rotating shaft 22 and pairs of bearings 20. The rotating shaft 22 is rotatably supported by the pairs of bearings 20. The rotor 12 includes a rotor core 24. The rotor core 24 has a bottomed cylindrical tubular shape, and is secured to the rotating shaft 22. The rotor 12 includes a plurality of magnets 18 mounted to a radially outer periphery of the rotor core 24.

The rotor core 24 includes a first cylindrical tubular member 24A, a second cylindrical tubular member 24B, and a circular plate member 24C. The first cylindrical tubular member 24A has a cylindrical tubular shape, and is configured such that the rotating shaft 22 is pressed to be fit in the first cylindrical tubular member 24A. The second cylindrical tubular member 24B first cylindrical tubular member 24B has a cylindrical tubular shape, and is located radially inside the first cylindrical tubular member 24A. Each of the first and second cylindrical tubular members 24A and 24B has opposing first and second ends in the axial direction. The circular plate member 24C is configured to join the first end of the first cylindrical tubular member 24A and the first end of the second cylindrical tubular member 24B. The second cylindrical tubular member 24B has a radially outer periphery constituting the radially outer periphery of the rotor core 24. The radially outer periphery of the second cylindrical tubular member 24B has a cylindrical shape extending in the circumferential direction. The magnets 18 described in detail later are secured to the radially outer periphery of the second cylindrical tubular member 24B.

Each magnet 18 is comprised of a magnetic compound whose intrinsic coercive force is 400 [kA/m] or more and whose remanent flux density is 1.0 [T] or more. Each magnet 18 can be comprised of, for example, a magnetic compound, such as $NdFe_{11}TIN$, $Nd_2Fe_{14}B$, $Sm_2Fe_{17}iN_3$, or FeNi. Each magnet 18 has opposing N-pole and S-pole outer surfaces. The magnets 18 are mounted to the radially outer periphery of the second tubular cylindrical member 24B such that the N-pole outer surfaces and S-pole outer surfaces of the magnets 18 are alternately arranged in the circumferential direction. The number of magnets 18 can be determined based on, for example, the required output of the motor 10.

Figure 5:
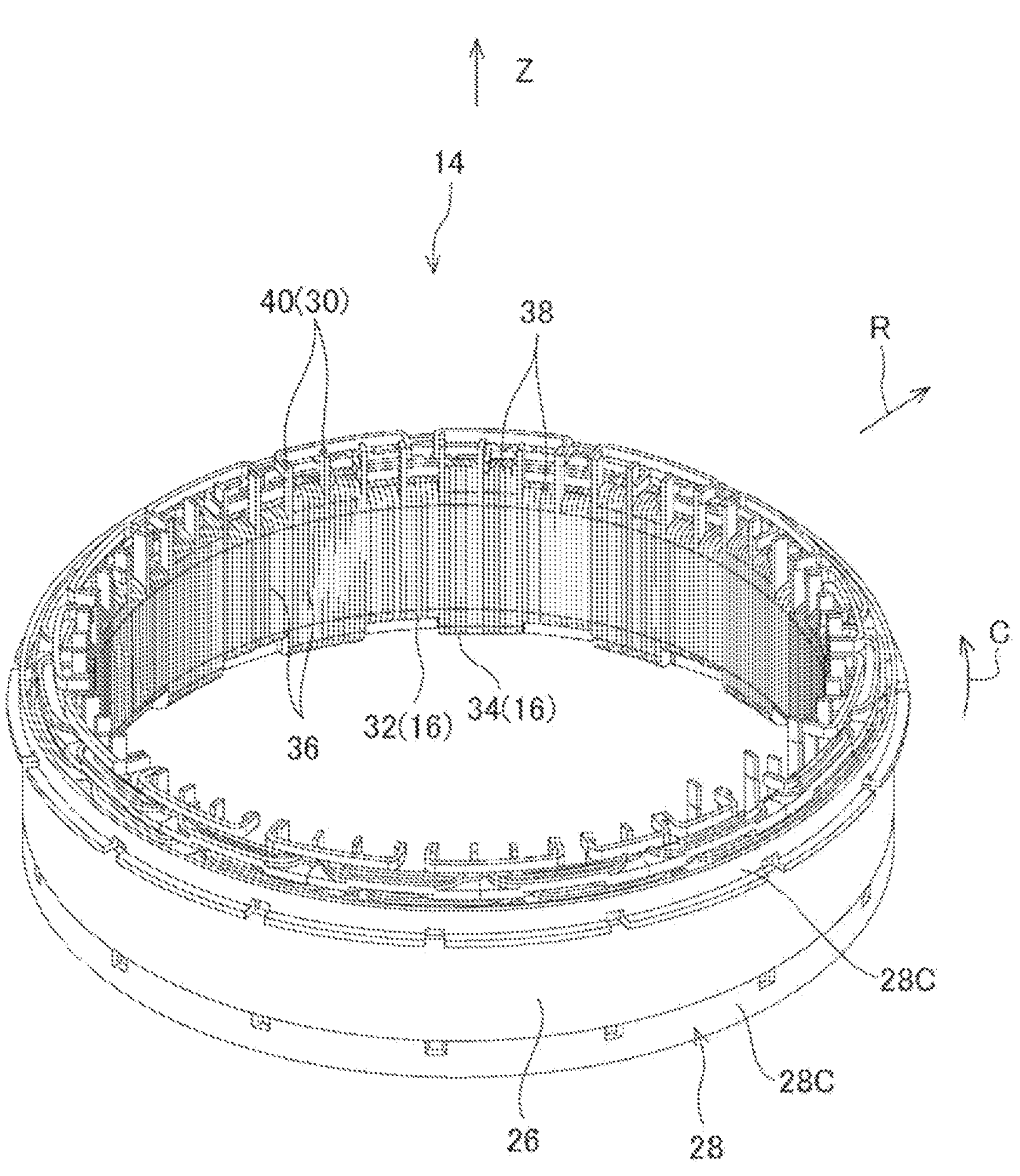
FIG. 5 is a perspective view illustrating the stator.

The stator 14 includes, as illustrated in FIG. 5, a stator core 26 serving as an armature core, an insulator 28, and the coils 16.

The stator core 26 has an annular shape.

The insulator 28 is mounted to the stator core 26. For example, the insulator 28 is adhesive to or fit in the stator core 26.

The coils 16 are mounted to the stator core 26 through the insulator 28.

The stator 14 of the first embodiment is configured to have a tooth-less structure with no parts (teeth) of the stator core 26 in the coils 16.

The stator core 26 is comprised of a soft-magnetic material, such as steel, and has, as illustrated in FIGS. 1 and 5, an annular shape. The stator core 26 has a thickness dimension in the radial direction that is greater than a dimension of a coil end portion 38 of each coil 16 in the radial direction; the structure of each coil 16 will be described in detail later.

The magnets 18 secured to the rotor core 24 has a center position in the axial direction around which they are circumferentially arranged. The stator core 12 and the rotor 12 are coaxially arranged, so that a center position of the stator core 26 in the axial direction agrees with the center position of the magnets 18 in the axial direction.

The stator core 26 of the first embodiment is comprised of a plurality of core sheets 27, each of which is comprised of a steel plate, stacked with their thickness directions being along the axial direction; the core sheets 27 are integrally assembled to each other with, for example, riveting or welding. The core sheets 27 of the first embodiment have the same thickness.

Figure 8A:
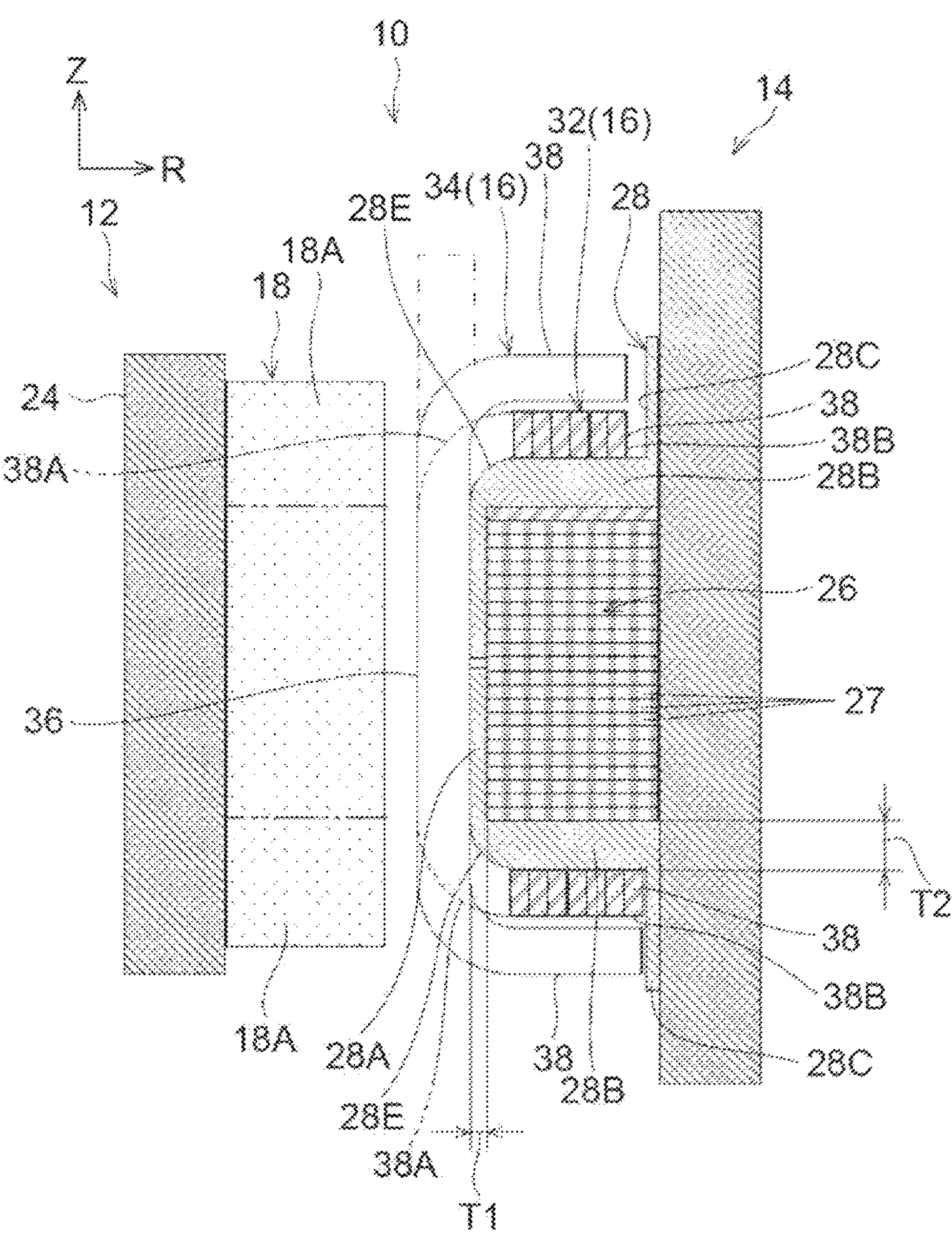
FIG. 8A is an enlarged axial sectional view illustrating a part of the stator and a part of the rotor.
Figure 8B:
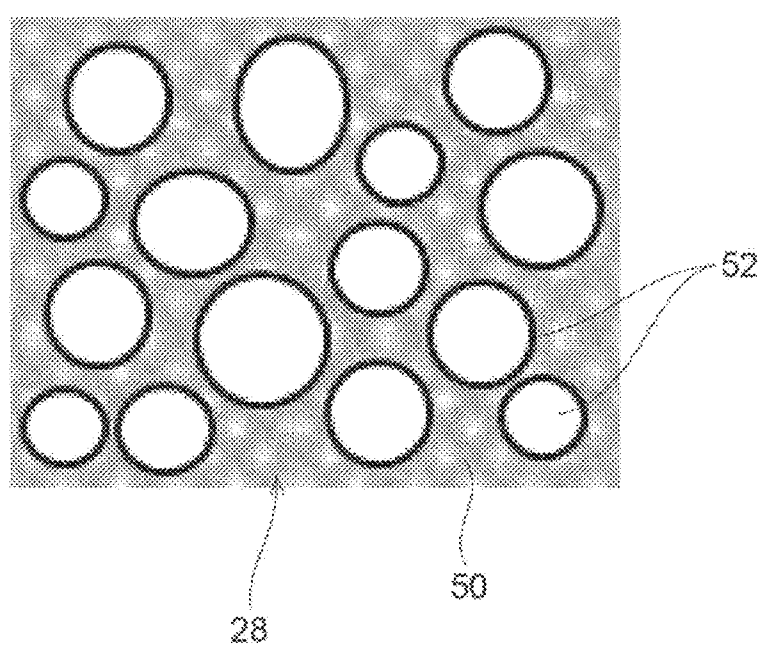
FIG. 8B is a view schematically illustrating a part of an insulator.
Figure 9:
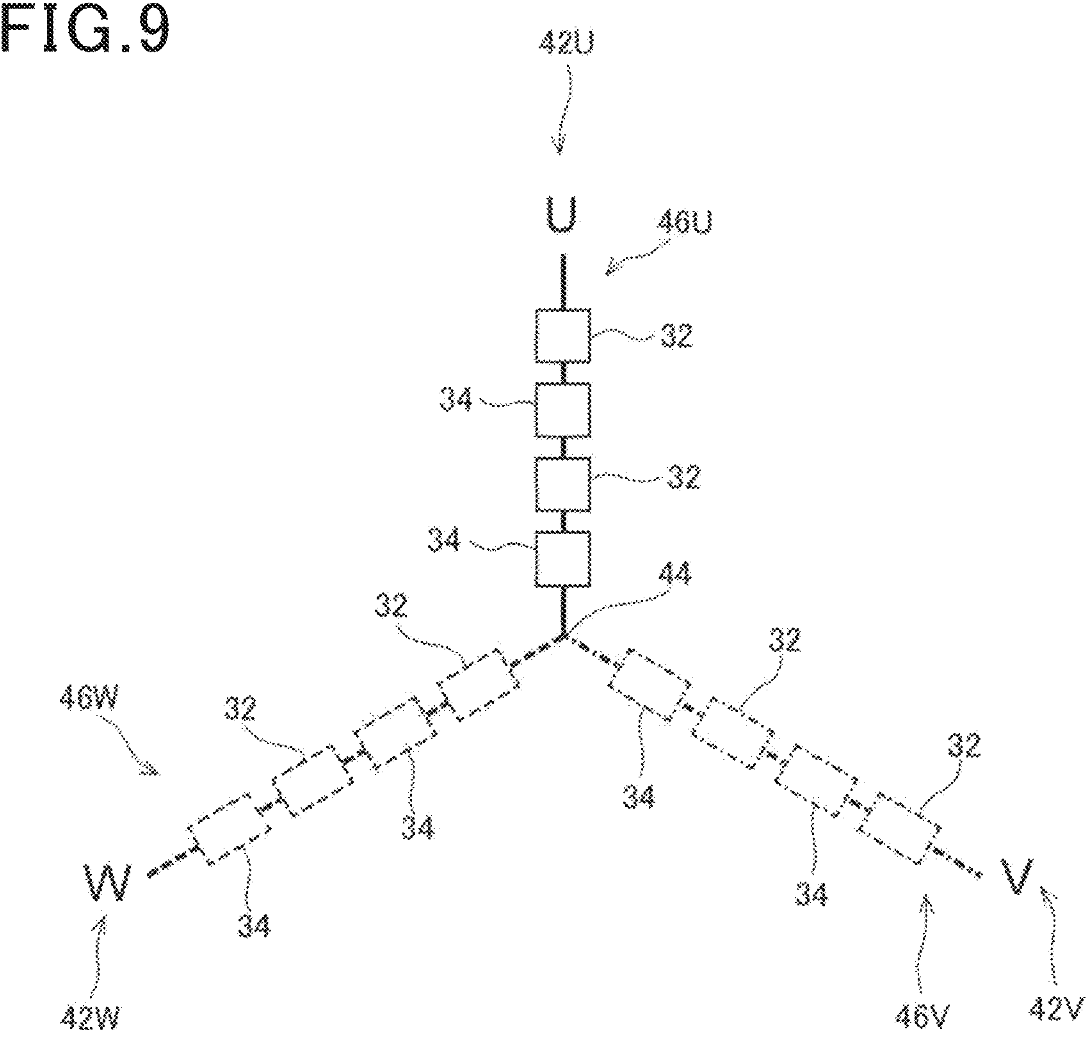
FIG. 9 is a diagram illustrating a connection configuration of U-, V-, and W-phase coils.

The insulator 28 is, as illustrated in FIGS. 8A and 8B, formed of resin mixed with metallic particles. With the insulator 28 mounted to the stator core 26, the insulator 28 covers the radially inner periphery of the stator core 26 and the first and second axial end surfaces of the stator core 26 in the axial direction. The detailed structure of the insulator 28 will be described later.

Figure 6A:
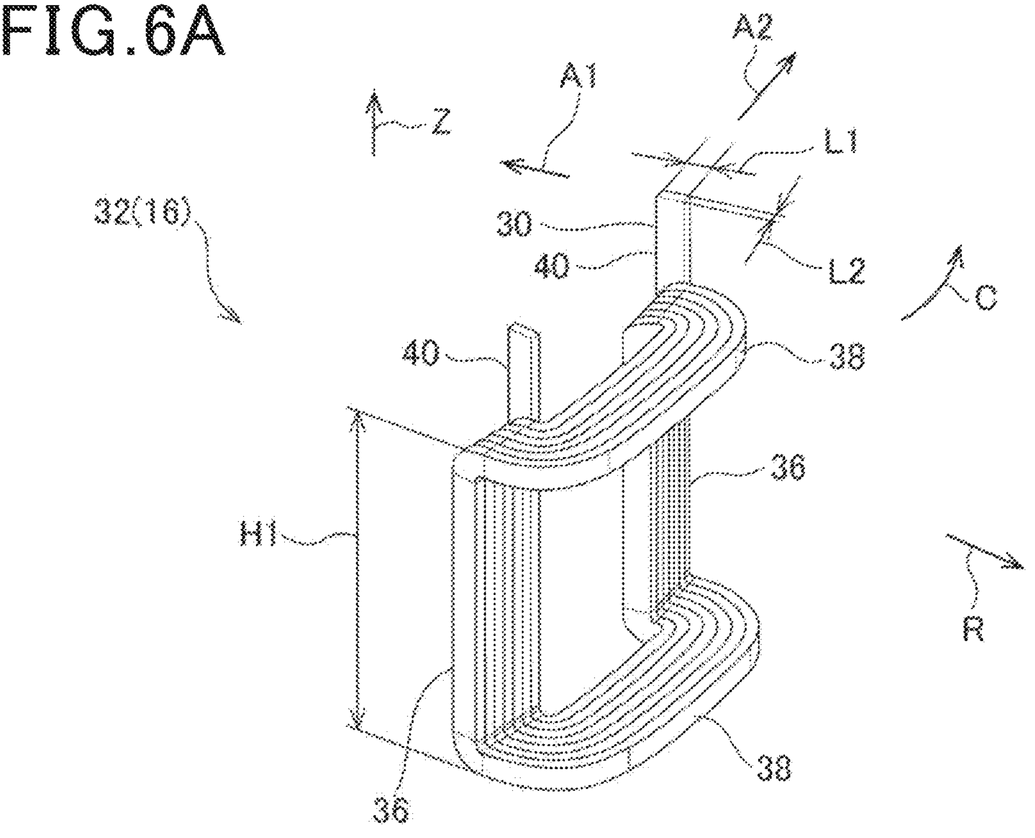
FIG. 6A is a perspective view of a short coil.
Figure 6B:
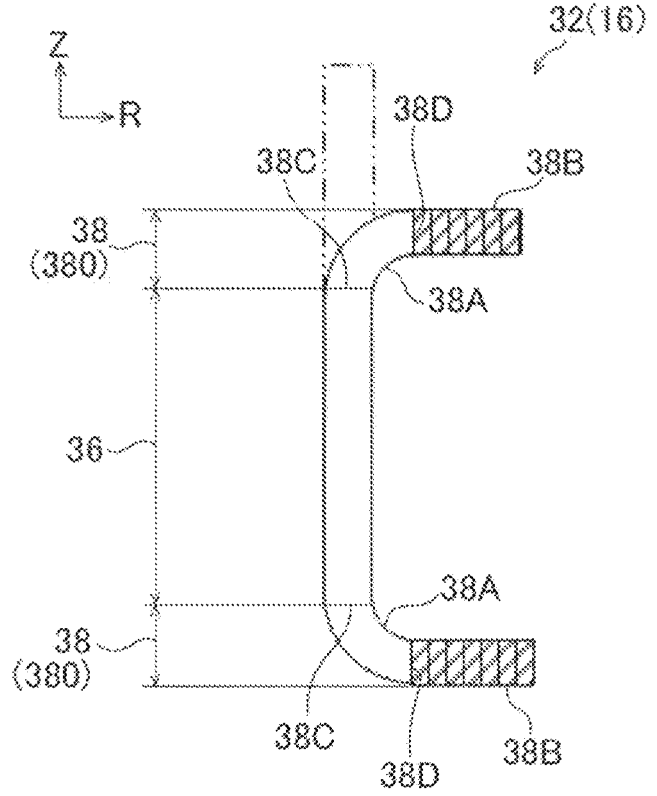
FIG. 6B is an axial sectional view of the short coil.
Figure 7:
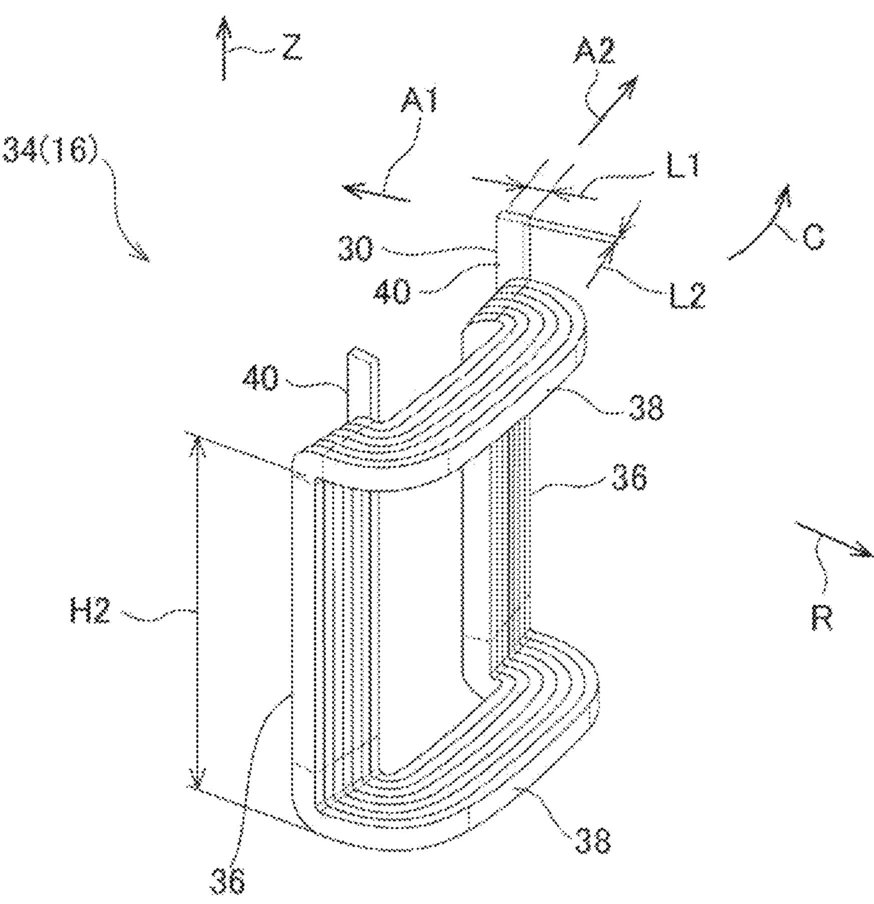
FIG. 7 is a perspective view of a long coil.

Each coil 16 is, as illustrated in FIGS. 5 to 7, is a conductive winding, i.e., a conductive wire, that is wound in the form of a ring. A winding 30, which constitutes each coil 16 of the first embodiment, has, as illustrated in FIGS. 6A and 6B, a substantially rectangular shape in its transverse section perpendicular to the longitudinal direction thereof. The rectangular cross section of the winding 30 of each coil 16 has a first dimension L1 in a first direction indicated by the arrow A1 and a second dimension L2 in a second direction indicated by the arrow A2 that is perpendicular to the first direction A1; the first dimension L1 is greater than the second dimension L2. The winding 30 can be comprised of a bundle of a plurality of conductive wires. Each adjacent pair of conductive wires in the bundle has an electrical resistance that is greater than an electrical resistance of each conducive wire itself. The winding 30 can have a substantially oval shape or a substantially elliptical shape. An enameled wire, such as an enameled copper wire or an enameled aluminum wire, can be suitably used as the winding 30.

The coils 16, which constitute the stator 14 of the first embodiment include, as illustrated in FIGS. 5 to 7, include a first type of coils 16 and a second type of coils 16. The length of each coil 16 included in the first type in the axial direction is different from the length of each coil 16 included in the second type in the axial direction. Each coil 16 included in the first type, whose length in the axial direction is shorter than each coil 16 included in the second type, will be referred to as a short coil 32, which is illustrated in FIG. 6A. In contrast, each coil 16 included in the second type, whose length in the axial direction is longer than each coil 16 included in the first type, will be referred to as a long coil 34, which is illustrated in FIG. 7. The number of coils 16 can be determined based on, for example, the required output of the motor 10.

Winding the winding 30 such that the winding 30 is stacked in the second direction A2 in the form of a rectangle forms a coil module having first and second ends in the axial direction. Thereafter, bending the first and second ends of the coil module toward the radial outside forms the short coil 32.

Specifically, each short coil 32 is comprised of a pair of first and second facing portions 36 and a pair of first and second coil end portions 38. The facing portions 36 are disposed to be aligned in the circumferential direction with a predetermined interval therebetween. Each of the first and second facing portions 36 has opposing first and second axial ends. The first coil end portion 38 links or joints the first axial ends of the respective first and second facing portions 36 to each other, and the second coil end portion 38 links or joints the second axial ends of the respective first and second facing portions 36 to each other. The first and second facing portions 36 of each short coil 32 constitute intermediate portions of the corresponding short coil 32, and the first and second coil end portions 38 of each short coil 32 constitute respective axial ends of the corresponding short coil 32.

The winding 30, which constitutes each short coil 32, has opposing first and second ends 40 in the axial direction. Each of the first and second facing portions 36 has opposing circumferential outer and inner portions. The first end 40 of the winding 30 is drawn from the circumferential outer portion of one of the paired first and second facing portions 36 toward the first side Z of the axial direction. The second end 40 of the winding 30 is drawn from the circumferential inner portion of the other of the paired first and second facing portions 36 toward the first side Z of the axial direction.

Hereinafter, one of the first and second ends 40 of the winding 30 constituting each short coil 32 will also be referred to as a winding start end 40A, and the other of the first and second ends 40 of the winding 30 constituting each short coil 32 will also be referred to as a winding termination end 40B.

The winding configuration of each short coil 32 results in the number of stacks of the first coil end portion 38 of the winding 30 being smaller than the number of stacks of the second coil end portion 38 of the winding 30. Specifically, the number of stacks of the first coil end portion 38 of the winding 30 is set to 6, and the number of stacks of the second coil end portion 38 of the winding 30 is set to 7. The number of stacks of each of the paired first and second facing portions 36 of the winding 30 is set to 7.

The paired first and second facing portions 36 of each short coil 32 constitute, as illustrated in FIG. 6B, the respective intermediate portions of the corresponding short coil 32 in the axial direction; the paired first and second facing portions 36 extend in the axial direction.

The first coil end portion 38 in the axial direction is located to protrude outward over the first ends of the paired first and second facing portions 36 toward the first side Z of the axial direction.

The first coil end portion 38 includes a pair of bent portions 38A and a coil end 38B. The bent portions 38A are bent radially outward from the respective first ends of the paired facing portions 36. The coil end 38B, which joins the extending ends of the bent portions 38A, is disposed to extend radially outward. A boundary between the first end of each of the paired first and second facing portions 36 and the corresponding one of the bent portions 38A will be referred to as a bend start point 38C. A boundary between each of the bent portions 38A and the coil end 38B will be referred to as a bend end point 38D.

The second coil end portion 38 in the axial direction is located to protrude over the second ends of the paired first and second facing portions 36 toward the second side of the axial direction.

The second coil end portion 38 includes a pair of bent portions 38A and a coil end 38B. The bent portions 38A are radially bent outward from the respective second ends of the paired first and second facing portions 36. The coil end 38B, which joins the extending ends of the bent portions 38A, is disposed to extend radially outward. A boundary between the second end of each of the paired first and second facing portions 36 and the corresponding one of the bent portions 38A will be referred to as a bend start point 38C. A boundary between each of the bent portions 38A and the coil end 38B will be referred to as a bend end point 38D.

The coil end portions 38 of the short coil 32 will also be referred to as bent coil end portions 380. That is, the bent coil end portions 380 are disposed to be the closest to the first axial end surface or the second axial end surface of the stator core 26 in the axial direction.

Each long coil 34 has, as illustrated in FIGS. 6A and 7, has substantially the same configuration as that of each short coil 32 except for the following different point. Specifically, each short coil 32 has a dimension H1 in the axial direction, and each long coil 34 has a dimension H2 in the axial direction. The different point between the configuration of each long coil 34 and that of each short coil 32 is that the dimension H2 is greater than the dimension H1. Descriptions of like parts between the short and long coils 32 and 34, to which like reference characters are assigned, are omitted. To portions of the long coil 34, which are respectively identical to portions of the short coil 32, reference characters used for the portions of the short coil 32 are assigned to omit descriptions of the long coil 34. The length of the winding 30 constituting the long coil 34 is longer than the length of the winding 30 constituting the short coil 32, resulting in the electrical resistance of the long coil 34 being higher than the electrical resistance of the short coil 32.

The following describes wire connections among the coils 16.

The coils 16 are connected in the form of, for example, a star connection.

The coils 16 are grouped into U-, V-, and W-phases 42U, 42V, and 42W. Each of the U-, V-, and W-phases 42U, 42V, and 42W is comprised of two short coils 32 and two long coils 34. The U-, V-, and W-phases 42U, 42V, and 42W provide a neutral point 44. In the U-phase 42U, the long coil 34, the short coil 32, the long coil 34, and the short coil 32 are connected in series in this order from the neutral point 44. In the V-phase 42V, the long coil 34, the short coil 32, the long coil 34, and the short coil 32 are connected in series in this order from the neutral point 44. In the W-phase 42W, the long coil 34, the short coil 32, the long coil 34, and the short coil 32 are connected in series in this order from the neutral point 44. For example, a busbar connects between each adjacent pair of coils 16, i.e., the short and long coils 32 and 34.

For the U-phase 42U, the farthest short coil 32 from the neutral point 44, the long coil 34, the short coil 32, and the closest long coil 34 to the neutral point 44 constitute a coil connection unit 46U. For the V-phase 42V, the farthest short coil 32 from the neutral point 44, the long coil 34, the short coil 32, and the closest long coil 34 to the neutral point 44 constitute a coil connection unit 46V. For the W-phase 42W, the farthest short coil 32 from the neutral point 44, the long coil 34, the short coil 32, and the closest long coil 34 to the neutral point 44 constitute a coil connection unit 46W.

The long and short coils 34 and 32 of each of the U-, V-, and W-phase coil connection units 46U, 46V, and 46W have a predetermined resultant resistance. That is, the number of long coils 34 of the U-phase coil connection unit 46U, the number of long coils 34 of the V-phase coil connection unit 46V, and the number of long coils 34 of the W-phase coil connection unit 46W are set to be identical to one another, and the number of short coils 32 of the U-phase coil connection unit 46U, the number of short coils 32 of the V-phase coil connection unit 46V, and the number of short coils 32 of the W-phase coil connection unit 46W are set to be identical to one another.

The above settings enable the resultant resistance of the long and short coils 34 and 32 of the U-phase coil connection unit 46U, the resultant resistance of the long and short coils 34 and 32 of the V-phase coil connection unit 46V, and the resultant resistance of the long and short coils 34 and 32 of the W-phase coil connection unit 46W to be identical to one another. The resultant resistance of one of the coil connection units 46U, 46V, and 46W being identical to that of another one of the coil connection units 46U, 46V, and 46W represents that the difference between the resultant resistance of one of the coil connection units 46U, 46V, and 46W and that of another one of the coil connection units 46U, 46V, and 46W is kept within plus or minus 5%.

Figure 10:
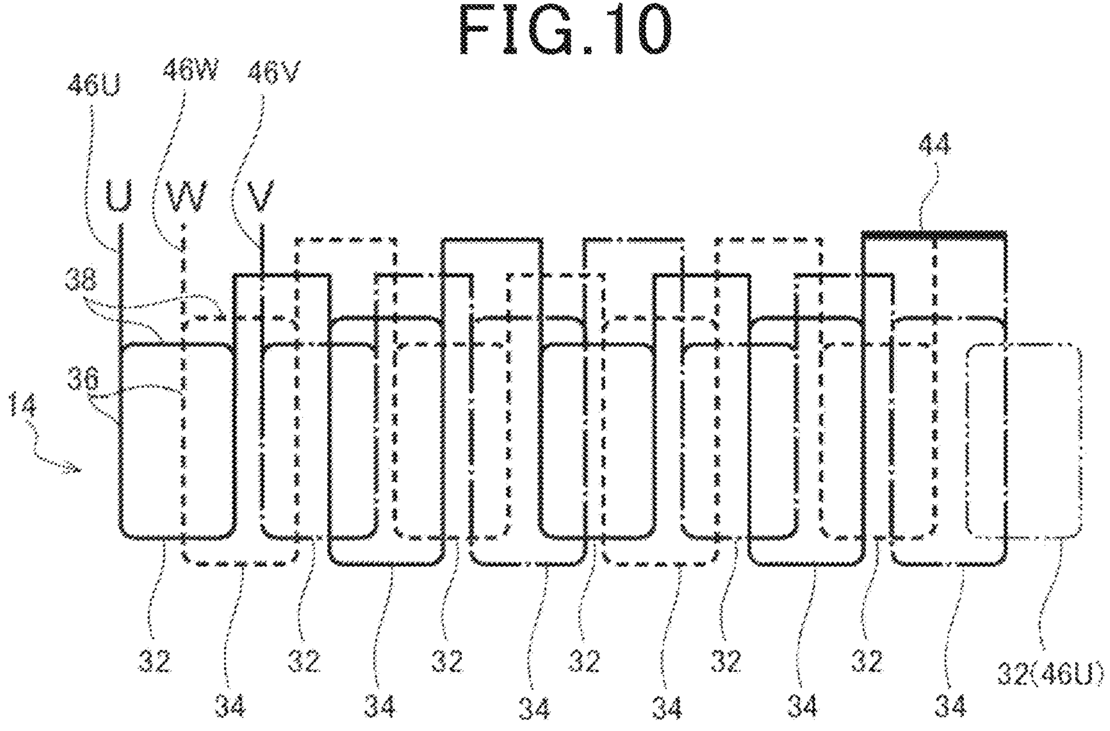
FIG. 10 is a schematic view illustrating a connection and an arrangement of the U-, V-, and W-phase coils.

FIG. 10 illustrates an arrangement of the coils 16 of the U-phase 42U, the coils 16 of the V-phase 42V, and the coils 16 of the W-phase 42W. As illustrated in FIGS. 10 and 8A, the short coil 32 of the U-phase 42U, which is located to be the farthest from the neutral point 44, and the short coil 32 of the V-phase 42V, which is located to be farthest from the neutral point 44, are arranged to be adjacent to one another along the stator core 26 in the circumferential direction. The long coil 34 of the W-phase 42W, which is located to be the farthest from the neutral point 44, is arranged to straddle the short coil 32 of the U-phase 42U, which is located to be the farthest from the neutral point 44, and the short coil 32 of the V-phase 42V, which is located to be farthest from the neutral point 44.

The short coil 32 of the V-phase 42V, which is located to be the farthest from the neutral point 44, and the short coil 32 of the W-phase 42W, which is located on the opposite side of the neutral point 44, are arranged to be adjacent to one another along the stator core 26 in the circumferential direction. The long coil 34 of the U-phase 42U, which is located on the opposite side of the neutral point 44, is arranged to straddle the short coil 32 of the V-phase 42V, which is located to be the farthest from the neutral point 44, and the short coil 32 of the W-phase 42W, which is located on the opposite side of the neutral point 44.

The short coil 32 of the W-phase 42W, which is located on the opposite side of the neutral point 44, and the short coil 32 of the U-phase 42U, which is located adjacent to the neutral point 44, are arranged to be adjacent to one another along the stator core 26 in the circumferential direction. The long coil 34 of the V-phase 42V, which is located on the opposite side of the neutral point 44, is arranged to straddle the short coil 32 of the W-phase 42W, which is located on the opposite side of the neutral point 44, and the short coil 32 of the U-phase 42U, which is located adjacent to the neutral point 44.

The short coil 32 of the U-phase 42U, which is located adjacent to the neutral point 44, and the short coil 32 of the V-phase 42V, which is located adjacent to the neutral point 44, are arranged to be adjacent to one another along the stator core 26 in the circumferential direction. The long coil 34 of the W-phase 42W, which is located adjacent to the neutral point 44, is arranged to straddle the short coil 32 of the U-phase 42U, which is located adjacent to the neutral point 44, and the short coil 32 of the V-phase 42V, which is located adjacent to the neutral point 44.

The short coil 32 of the V-phase 42V, which is located adjacent to the neutral point 44, and the short coil 32 of the W-phase 42W, which is located adjacent to the neutral point 44, are arranged to be adjacent to one another along the stator core 26 in the circumferential direction. The long coil 34 of the U-phase 42U, which is located adjacent to the neutral point 44, is arranged to straddle the short coil 32 of the V-phase 42V, which is located adjacent to the neutral point 44, and the short coil 32 of the W-phase 42W, which is located to be close to the neutral point 44.

The short coil 32 of the W-phase 42W, which is located adjacent to the neutral point 44, and the short coil 32 of the U-phase 42U, which is located to be farthest from the neutral point 44, are arranged to be adjacent to one another along the stator core 26 in the circumferential direction. The long coil 34 of the V-phase 42V, which is located adjacent to the neutral point 44, is arranged to straddle the short coil 32 of the W-phase 42W, which is located adjacent to the neutral point 44, and the short coil 32 of the U-phase 42U, which is located to be farthest from the neutral point 44.

Next, the following describes the structure of the insulator 28.

The insulator 28, to which the coils 16 are mounted, includes, as illustrated in FIG. 8A, an inner-periphery cover member 28A serving as a facing-portion intervention member; the inner-periphery cover member 28A covers the radially inner periphery of the stator core 26. The insulator 28 additionally includes a pair of first and second end-surface cover members 28B serving as a pair of first and second coil-end intervention members. The first end-surface cover member 28B covers the first end surface of the stator core 26, and the second end-surface cover member 28B covers the second end surface of the stator core 26. The inner-periphery cover member 28A has a thickness dimension T1 in the radial direction, and each of the first and second end-surface cover members 28B has a thickness dimension T2 in the axial direction; the thickness dimension T2 is greater than the thickness dimension T1.

The insulation 28 additionally includes a pair of first and second outer peripheral flanges 28C. Each of the first and second end-surface covers 28B has a radially outer peripheral edge, and each of the first and second outer peripheral flanges 28C is disposed to extend outward from the radially outer peripheral edge of the corresponding one of the first and second end-surface covers 28B in the axial direction.

Figure 11:
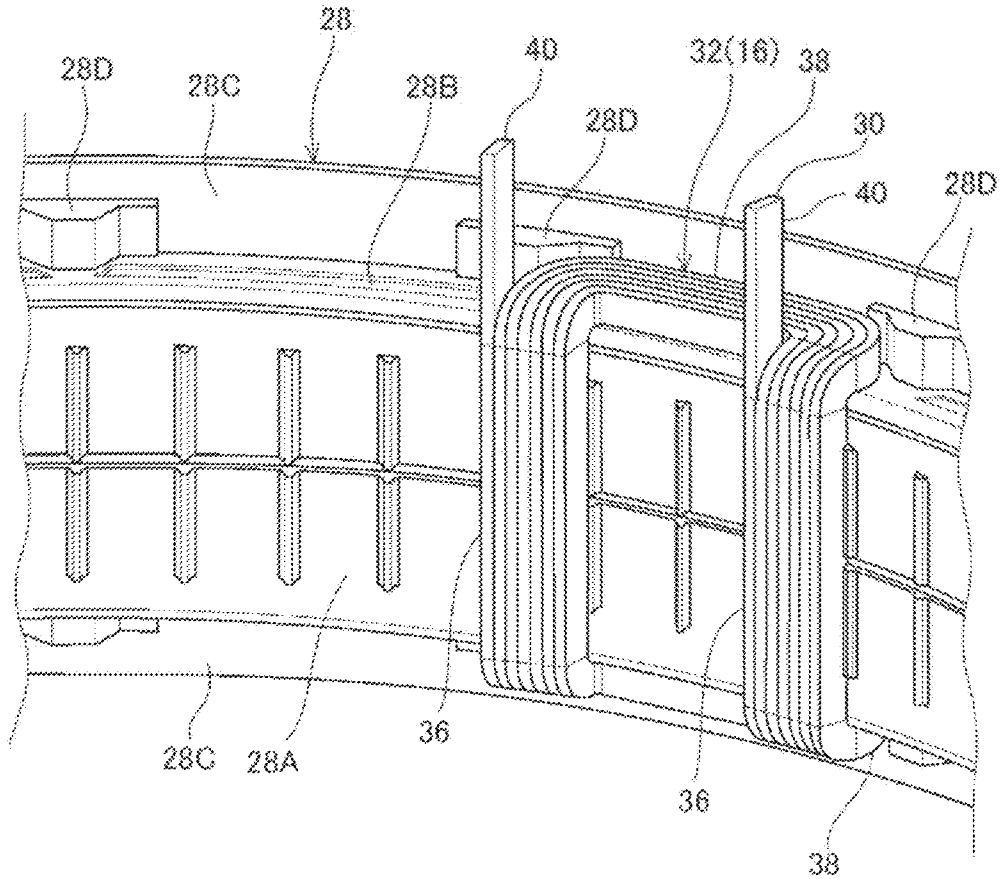
FIG. 11 is a perspective view illustrating the insulator and a coil supported to a stator core through the insulator.

The insulator 28 additionally includes, as illustrated in FIG. 11, a plurality of circumferential positioning members 28D for positioning the short coils 32 in the circumferential direction. Each circumferential positioning member 28D has a convex shape protruding radially inward from the inner periphery of one of the first and second outer peripheral flanges 28C. Specifically, the circumferential positioning members 28D protruding from one of the first and second outer peripheral flanges 28C are arranged at regular intervals in the circumferential direction.

Each short coil 32 is specifically arranged such that one of the first and second coil end portions 38 is interposed between a corresponding adjacent pair of the circumferential positioning members 28D protruding from one of the first and second peripheral flanges 28C.

This enables each short coil 32 to be positioned in the circumferential direction.

The circumferential positioning members 28D may be provided from the inner periphery of one of the first and second outer peripheral flanges 28C, or can be provided from the inner periphery of each of the first and second outer peripheral flanges 28C. This enables each short coil 32 to be arranged such that (I) The first coil end portion 38 is interposed between a corresponding adjacent pair of the circumferential positioning members 28D protruding from the first outer peripheral flange 28C (II) The second coil end portion 38 is interposed between a corresponding adjacent pair of the circumferential positioning members 28D protruding from the second outer peripheral flange 28C The insulator 28 has a divided two-segment configuration comprised of, as illustrated in FIG. 8A, first and second segments partitioned at the center of the inner-periphery cover member 28A in the axial direction.

Figure 12:
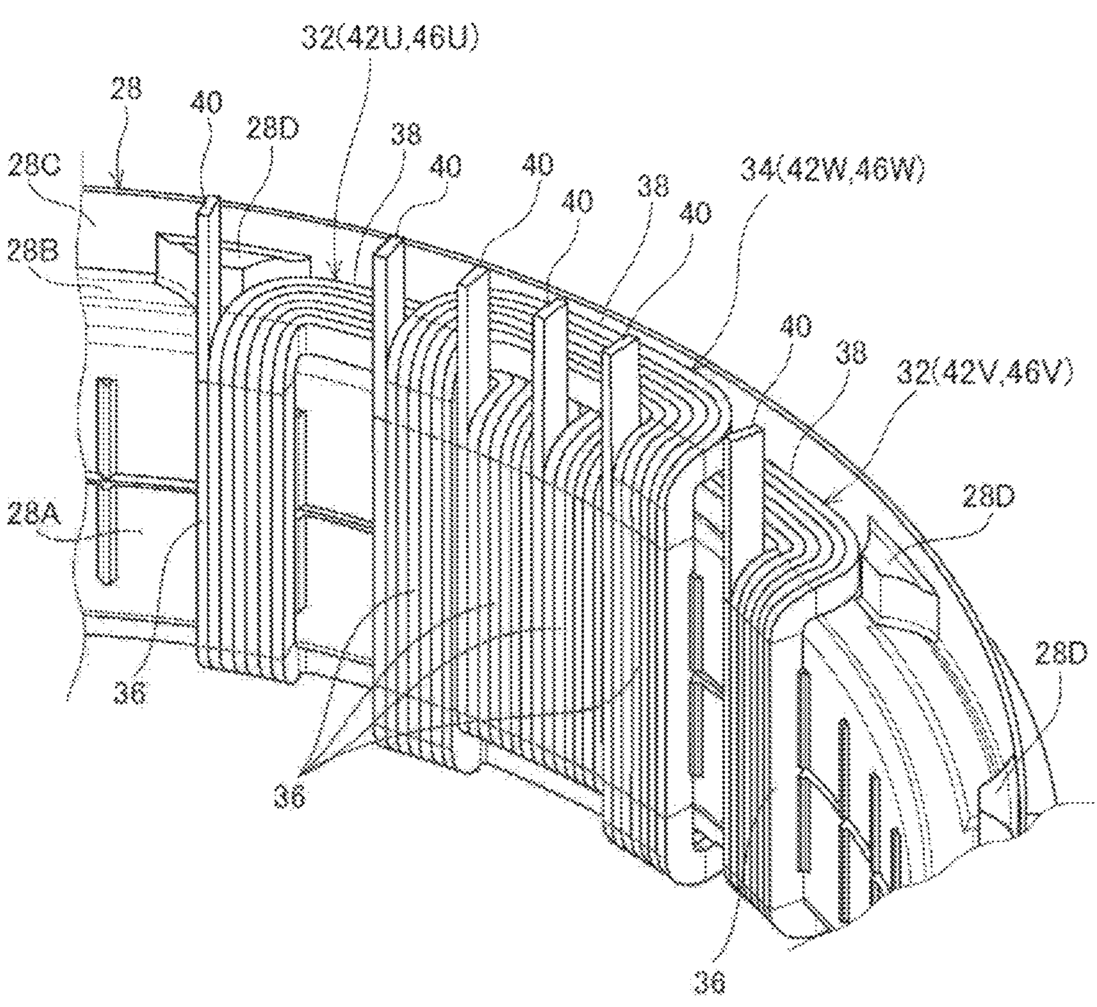
FIG. 12 is a perspective view illustrating the insulator and the U-, V-, and W-phase coils supported to the stator core through the insulator.

FIGS. 8A, 10, and 12 show that the paired first and second facing portions 36 of the short coils 32 and the paired first and second facing portions 36 of the long coils 34 are arranged through the inner-periphery cover member 28A along the radially inner periphery of the stator core 26 while each facing portion 36 has a radially constant position with respect to the center position of the stator core 26.

Specifically, the second facing portion 36 of a selected short coil 32 of the U-phase illustrated in FIG. 12, the first facing portion of a selected short coil 32 of the V-phase, which is circumferential adjacent to the selected short coil 32 of the U-phase, and the first and second facing portions 36 of a selected long coil 34 of the W-phase have a predetermined arrangement relationship that (I) The second facing portion 36 of the selected short coil 32 of the U-phase and the first facing portion 36 of the selected short coil 32 of the V-phase, which is circumferential adjacent to the selected short coil 32 of the U-phase, are arranged to be circumferentially adjacent to one another (II) The second facing portion 36 of the selected short coil 32 of the U-phase and the first facing portion 36 of the selected short coil 32 of the V-phase, which is circumferential adjacent to the selected short coil 32 of the U-phase, are interposed between the first and second facing portions 36 of the selected long coil 34 of the W-phase As illustrated in FIGS. 10 and 12, the other first and second facing portions 36 of the short coils 32 of the U, V, and W-phases and the first and second facing portions of the long coils 36 of the U, V, and W-phases are similarly arranged along the radially inner periphery of the stator core 26 to satisfy an arrangement relationship similar to the above arrangement relationship. The facing portions 36 of each short coil 32 have a predetermined center position in the axial direction, and the facing portions 36 of each long coil 34 also have a predetermined center position in the height direction. Each magnet 18 also has a predetermined center position in the height direction.

The magnets 18 are circumferentially arranged such that each magnet 18 radially faces (i) at least one of the facing portions 36 of a corresponding at least one short coil 32 and (ii) at least one of the facing portions 36 of a corresponding at least one of the long coils 34 while the center positions of the facing portions 36 of the coils 32 and 34 and the center positions of the magnets 18 have the same height in the axial direction.

Each short coil 32 is arranged such that the first direction A1 of the winding 30 constituting the first and second facing portions 36 of the corresponding short coil 32 is oriented toward a corresponding at least one of the magnets 18. Similarly, each long coil 34 is arranged such that the first direction A1 of the winding 30 constituting the first and second facing portions 36 of the corresponding long coil 34 is oriented toward a corresponding at least one of the magnets 18.

FIGS. 8A, 10, and 12 show that the first coil end portion 38 of each short coil 32 is arranged through the first end-surface cover member 28B of the insulator 28 along the first end surface of the stator core 26, and the second coil end portion 38 of each short coil 32 is arranged through the second end-surface cover member 28B of the insulator 28 along the second end surface of the stator core 26. Additionally, the first coil end portion 38 of each long coil 34 is arranged through (i) the first end-surface cover member 28B and (ii) the first coil end portions 38 of a corresponding adjacent pair of the short coils 32 along the first end surface of the stator core 26. Similarly, the second coil end portion 38 of each long coil 34 is arranged through (i) the second end-surface cover member 28B and (ii) the second coil end portions 38 of a corresponding adjacent pair of the short coils 32 along the second end surface of the stator core 26.

Specifically, the first coil end portion 38 of each long coil 34 is arranged to overlap the first coil end portions 38 of a corresponding adjacent pair of the short coils 32 in the axial direction, and the second coil end portion 38 of each long coil 34 is arranged to overlap the second coil end portions 38 of a corresponding adjacent pair of the short coils 32 in the axial direction.

In more detail, (i) the first and second coil end portions 38 of a U-phase selected short coil 32 illustrated in FIG. 12, (ii) the first and second facing portions of a selected V-phase short coil 32, which is circumferential adjacent to the U-phase selected short coil 32, and (iii) the first and second coil end portions 38 of a selected W-phase long coil 34 have a predetermined arrangement relationship that (I) The first coil end portion 38 of the selected long coil 34 of the W-phase illustrated in FIG. 12 is arranged to overlap a circumferential outer end of the first coil end portion 38 of the second facing portion 36 of a U-phase selected short coil 32 and a circumferential outer end of the first facing portion 36 of the V-phase selected short coil 32

(II) The second coil end portion 38 of the selected long coil 34 of the W-phase illustrated in FIG. 12 is arranged to overlap a circumferential outer end of the second coil end portion 38 of the second facing portion 36 of the U-phase selected short coil 32 and a circumferential outer end of the second facing portion 36 of the V-phase selected short coil 32

As illustrated in FIGS. 10 and 12, the other first coil end portions 38 of the short coils 32 of the U, V, and W-phases and the other first coil end portions 38 of the long coils 34 of the U, V, and W-phases are similarly arranged along the first end surfaces of the stator core 26 to satisfy an arrangement relationship similar to the above arrangement relationship, and the other second coil end portions 38 of the short coils 32 of the U, V, and W-phases and the other second coil end portions 38 of the long coils 34 of the U, V, and W-phases are similarly arranged along the second end surfaces of the stator core 26 to satisfy an arrangement relationship similar to the above arrangement relationship.

The following describes how the motor 10 of the first embodiment operates to achieve advantageous benefits.

Switching energization among the U-phase coil unit 46U, the V-phase coil unit 46V, and the W-phase coil unit 46W, which constitute a part of the stator 14, in the motor 10 of the first embodiment causes a rotating magnetic field inside the stator 14. The rotating magnetic field causes the rotor 12 to rotate.

The number of long coils 34 of the U-phase coil connection unit 46U, the number of long coils 34 of the V-phase coil connection unit 46V, and the number of long coils 34 of the W-phase coil connection unit 46W are set to be identical to one another, and the number of short coils 32 of the U-phase coil connection unit 46U, the number of short coils 32 of the V-phase coil connection unit 46V, and the number of short coils 32 of the W-phase coil connection unit 46W are set to be identical to one another.

The above settings enable the resultant resistance of the long and short coils 34 and 32 of the U-phase coil connection unit 46U, the resultant resistance of the long and short coils 34 and 32 of the V-phase coil connection unit 46V, and the resultant resistance of the long and short coils 34 and 32 of the W-phase coil connection unit 46W to be identical to one another.

This makes it less likely for an electrical imbalance among the U-, V-, and W-phase coil connection units 46U, 46V, and 46W to occur, resulting in reduced torque ripple of the motor 10.

The first and second coil end portions 38 of each long coil 34 are bent radially outside the first and second facing portions 36 to be perpendicular to the first and second facing portions 36, and the first and second coil end portions 38 of each short coil 32 are bent radially outside the first and second facing portions 36 to be perpendicular to the first and second facing portions 36. Additionally, the first coil end portion 38 of each long coil 34 is arranged to overlap the first coil end portions 38 of a corresponding adjacent pair of the short coils 32 in the axial direction, and the second coil end portion 38 of each long coil 34 is arranged to overlap the second coil end portions 38 of a corresponding adjacent pair of the short coils 32 in the axial direction.

The above configuration of the motor 10 results in a reduced size of the motor 10 in the axial direction.

The transverse section of the winding 30 constituting each coil 16 has a rectangular shape whose longitudinal direction is oriented toward the first direction A1. Additionally, each short coil 32 is arranged such that the first direction A1 of the winding 30 constituting the first and second facing portions 36 of the corresponding short coil 32 is oriented toward a corresponding at least one of the magnets 18. Similarly, each long coil 34 is arranged such that the first direction A1 of the winding 30 constituting the first and second facing portions 36 of the corresponding long coil 34 is oriented toward a corresponding at least one of the magnets 18.

The above configurations result in reduced areas of each winding 30, which face the magnets 18, while ensuring the area of the transverse section of the corresponding winding 30. This prevents an increase in copper loss due to eddy current, eddy alternating current, caused in the first and second facing portions 36.

Additionally, the motor 10 of the first embodiment is configured such that the first and second facing portions 36 constitute a single-layer structure disposed along the radially inner periphery of the stator core 26. This results in the first and second facing portions 36 being more easily curved along the radially inner periphery of the stator core 26 in view of the axial direction, making it possible for the motor 10 to have an improved coil space factor.

The opposing first and second ends of the winding 30 constituting each coil 16 are disposed toward the first side Z of the axial direction while the number of stacks of the first coil end portion 38 of the winding 30 is smaller than the number of stacks of the second coil end portion 38 of the winding 30. This configuration enables the length of the wound portion of the winding 30 in each coil 16 to be smaller, resulting in a reduced electrical resistance of each coil 16.

Next, the following describes a specific configuration applied to the motor 10 of the first embodiment; the specific configuration contributes to an improvement of output torque of the motor 10 while maintaining the size of the motor 10.

The stator core 26 of the first embodiment has a dimension in the axial direction, and each magnet 18 has a dimension in the axial direction. The dimension of the stator core 26 of the first embodiment has a dimension in the axial direction is, as illustrated in FIG. 8A, smaller than the dimension of each magnet 18 in the axial direction. In addition to this configuration, the whole of the stator core 26 is arranged to face the assembly of the magnets 18 of the rotor 12. The whole of the inner-periphery cover member 28A of the insulator 28 and the whole of each of the first and second end-surface cover members 28B are arranged to face the assembly of the magnets 18 of the rotor 12. That is, each magnet 18 has a first portion in the axial direction that is located to protrude outward over the first end surface of the stator core 26 in the axial direction toward the first side Z of the axial direction; the first portion of each magnet 18 will be referred to as a first overhang portion 18A. Similarly, each magnet 18 has a second portion in the axial direction that is located to protrude outward over the second end surface of the stator core 26 in the axial direction toward the second side of the axial direction; the second portion of each magnet 18 will be referred to as a second overhang portion 18A.

The insulator 28 is comprised of, as illustrated in FIG. 8B, a base 50 comprised of an insulating material, and soft-magnetic members 52, each of which is comprised of a soft-magnetic material, contained in the base 50. In particular, the whole of the insulator 28 is comprised of the base 50 and the soft-magnetic members 52 contained in the base 50. For example, the base 50 can be formed of a resin material, and metallic atomized-powder particles can be used as the soft-magnetic members 52.

The soft-magnetic members, i.e., the metallic atomized-powder particles, 52 have an average radius that is set to be one-fifth or less the thickness dimension T1 of the inner-periphery cover member 28A in the radial direction. For example, if the thickness dimension T1 of the inner-periphery cover member 28A in the radial direction is set to 0.5 mm, the average radius of the soft-magnetic members 52 can be set to be less than or equal to 100 μm.

Injection molding can be used to produce the insulator 28. During an injection molding process for producing the insulator 28, the soft-magnetic members 52 are dispersed in a molten state of the base 50. This results in the soft-magnetic members 52 being less closely adhered to one another. Even after the base 50 is cooled to be solid, the soft-magnetic members 52 is kept to be less closely adhered to one another, resulting in the base 50 between the soft-magnetic members 52 ensuring the electrical insulation therebetween. Applying chemical treatment, such as oxidation, to the surface of each soft-magnetic member 52 can enhance the level of electrical insulation between the soft-magnetic members 52. Coating each soft-magnetic member 52 with an additional insulating material except for the insulating material of the base 50 can enhance the level of electrical insulation between the soft-magnetic members 52.

The radially inner periphery of the first end-surface cover members 28B of the insulator 28 has an inner diameter that becomes, as illustrated in FIG. 8A, gradually greater toward the first side Z of the axial direction. Similarly, the radially inner periphery of the second end-surface cover member 28B of the insulator 28 has an inner diameter that becomes, as illustrated in FIG. 8A, gradually greater toward the second side of the axial direction.

This results in the radially inner periphery of each of the first and second end-surface cover members 28B of the insulator 28 being convexly curved to form a curved surface 28E. This enables the shape of the radially inner periphery of each of the first and second end-surface cover members 28B of the insulator 28 to be in conformity with the inner curved surface of the corresponding one of the bent portions 38A of each short coil 32 of the wound winding 30.

Figure 13:
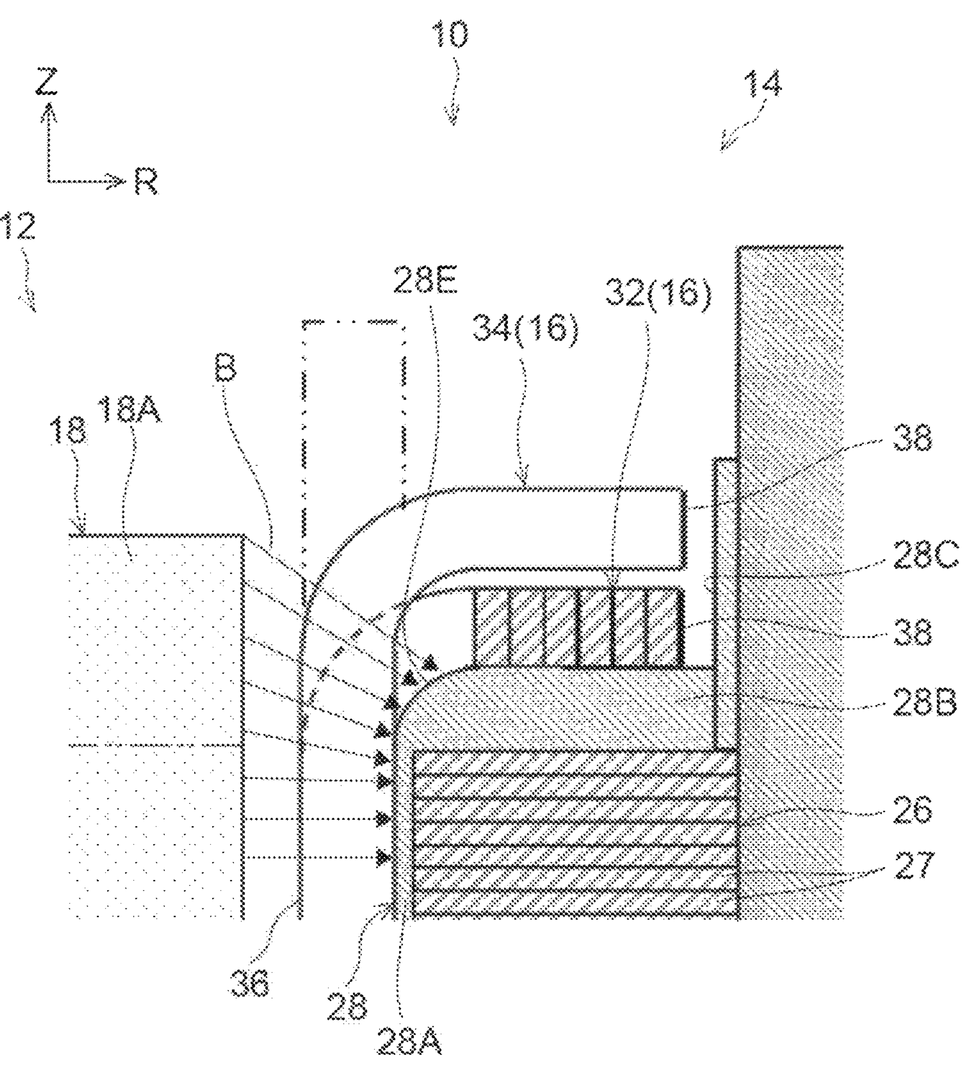
FIG. 13 is an enlarged axial sectional view illustrating the flow of magnetic flux from magnets to the stator core.

The motor 10 of the first embodiment, to which the specific configuration set forth above has been applied, includes the insulator 28. The insulator 28 is comprised of the base 50 formed of an insulating material, and the soft-magnetic members 52 formed of a soft-magnetic material contained in the base 50. This configuration enables, as illustrated in FIG. 13, magnetic flux generated by the magnets 18 to be introduced through the soft-magnetic members 52 (see FIG. 8B) contained in the insulator 28 into the stator core 26, resulting in a reduced magnetic resistance between the stator core 26 and the magnets 18. This reduction in magnetic resistance between the stator core 26 and the magnets 18 efficiently uses the magnetic flux (see arrow B in FIG. 13) generated by the magnets 18, leading to an increase in the output torque of the motor 10 and a reduction in the size of the motor 10.

The motor 10 of the first embodiment, to which the specific configuration set forth above has been applied, enables a part of the magnetic flux generated by the first and second overhang portions 18A and 18B of the magnets 18 to be introduced into the soft-magnetic members 52 contained in the insulator 28, resulting in a further reduced magnetic resistance between the stator core 26 and the magnets 18. This further reduction in magnetic resistance between the stator core 26 and the magnets 18 more efficiently uses the magnetic flux, leading to a further increase in the output torque of the motor 10 and a further reduction in the size of the motor 10.

The motor 10 of the first embodiment, to which the specific configuration set forth above has been applied, enables heat due to the coils 16, i.e., the windings 30, to be immediately transferred to the stator core 26 through the soft-magnetic members 52 contained in the insulator 28. This results in a higher heat-dissipation performance of the coils 16 as compared with a case where the insulator 28 is formed of only resin material, contributing to a further higher output of the motor 10.

The motor 10 of the first embodiment, to which the specific configuration set forth above has been applied, includes the soft-magnetic members, such as metallic atomized-powder particles, 52 contained in the insulator 26, and the average radius of the soft-magnetic members 52 is set to be one-fifth or less the thickness dimension T1 of the inner-periphery cover member 28A in the radial direction. This configuration enables, even if the thickness dimension T1 of the inner-periphery cover member 28A is smaller than the thickness dimension T2 of each of the first and second end-surface cover members 28B, the soft-magnetic members 52 to be uniformly dispersed in the inner-periphery cover member 28A during an injection molding process for producing the insulator 28.

Second Embodiment

Figure 14:
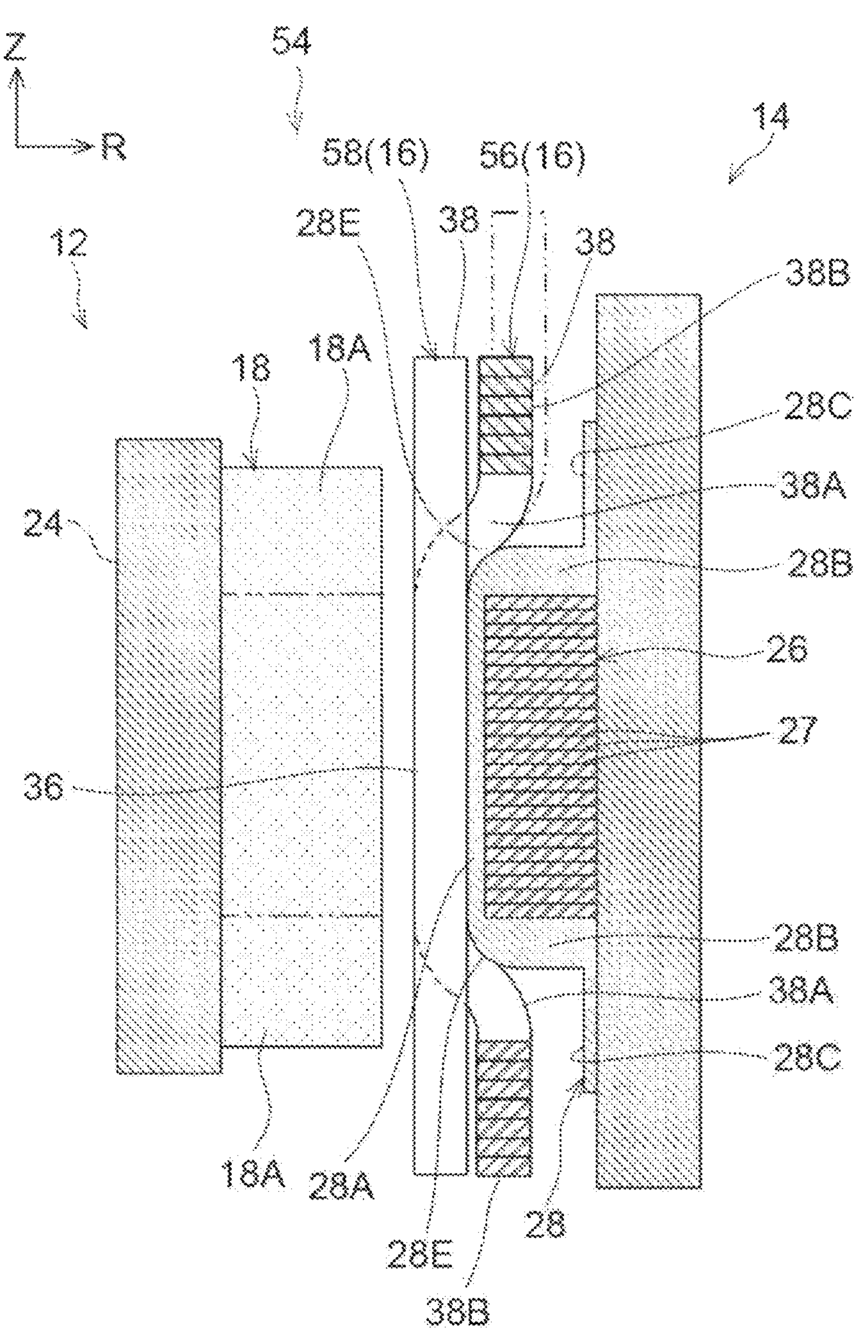
FIG. 14 is an enlarged axial sectional view illustrating a part of a stator and a part of a rotor according to the second embodiment.

The following describes a motor 54 according to the second embodiment of the present disclosure with reference to FIG. 14. To selected parts and components of the motor 54 of the second embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 54 may be omitted.

The configuration of the motor 54 of the second embodiment is substantially identical to the configuration of the motor 10 except for the following different points.

Specifically, the motor 54 includes, as the coils 16, first coils 56 and second coils 58. Each first coil 56 has opposing first and second coil end portions 38 in the axial direction, and each of the first and second coil end portions 38 is bent. Each second coil 58 has opposing first and second coil end portions 38 in the axial direction, and each of the first and second coil end portions 38 of each second coil 58 extends straight without being bent with respect to the first and second facing portions 36. Additionally, the insulator 28 has an undivided configuration in the axial direction.

For example, inserting the undivided insulator 28 into a mold in which the tubular cylindrical core 26 has been installed enables the undivided insulator 28 and the tubular cylindrical core 26 to be integrated with one another. As another example, fitting circumferentially divided core-segments to the undivided insulator 28, which has been mold-injected, from the radially outside of the undivided insulator 28 enables the core-segments to be integrated with the undivided insulator 28.

In particular, like the motor 10, the whole of the insulator 28 of the motor 54 is comprised of the base 50 and the soft-magnetic members 52 contained in the base 50.

The first coil end portion 38 of each first coil 56 includes a pair of bent portions 38A and a coil end 38B. Each bent portion 38A is comprised of radially inner and outer portions. The radially inner portion of each bent portion 38A is bent radially outward from the first end of the corresponding one of the paired facing portions 36. The radially outer portion of each bent portion 38A is bent to extend in the axial direction. The coil end 38B, which joins the extending ends of the bent portions 38A, is disposed to extend in the axial direction. Similarly, the second coil end portion 38 of each first coil 56 includes a pair of bent portions 38A and a coil end 38B. Each bent portion 38A is comprised of radially inner and outer portions. The radially inner portion of each bent portion 38A is bent radially outward from the second end of the corresponding one of the paired facing portions 36. The radially outer portion of each bent portion 38A is bent to extend in the axial direction. The coil end 38B, which joins the extending ends of the bent portions 38A, is disposed to extend in the axial direction. The first coil end portion 38 of each second coil 58 is arranged to radially overlap the coil ends 38B of the first coil end portions 38 of a corresponding adjacent pair of the first coils 56.

Similarly, the second coil end portion 38 of each second coil 58 is arranged to radially overlap the coil ends 38B of the second coil end portions 38 of a corresponding adjacent pair of the first coils 56.

The motor 54 of the second embodiment therefore has a higher level of the output torque of the motor 10 with a smaller size.

Third Embodiment

Figure 15A:
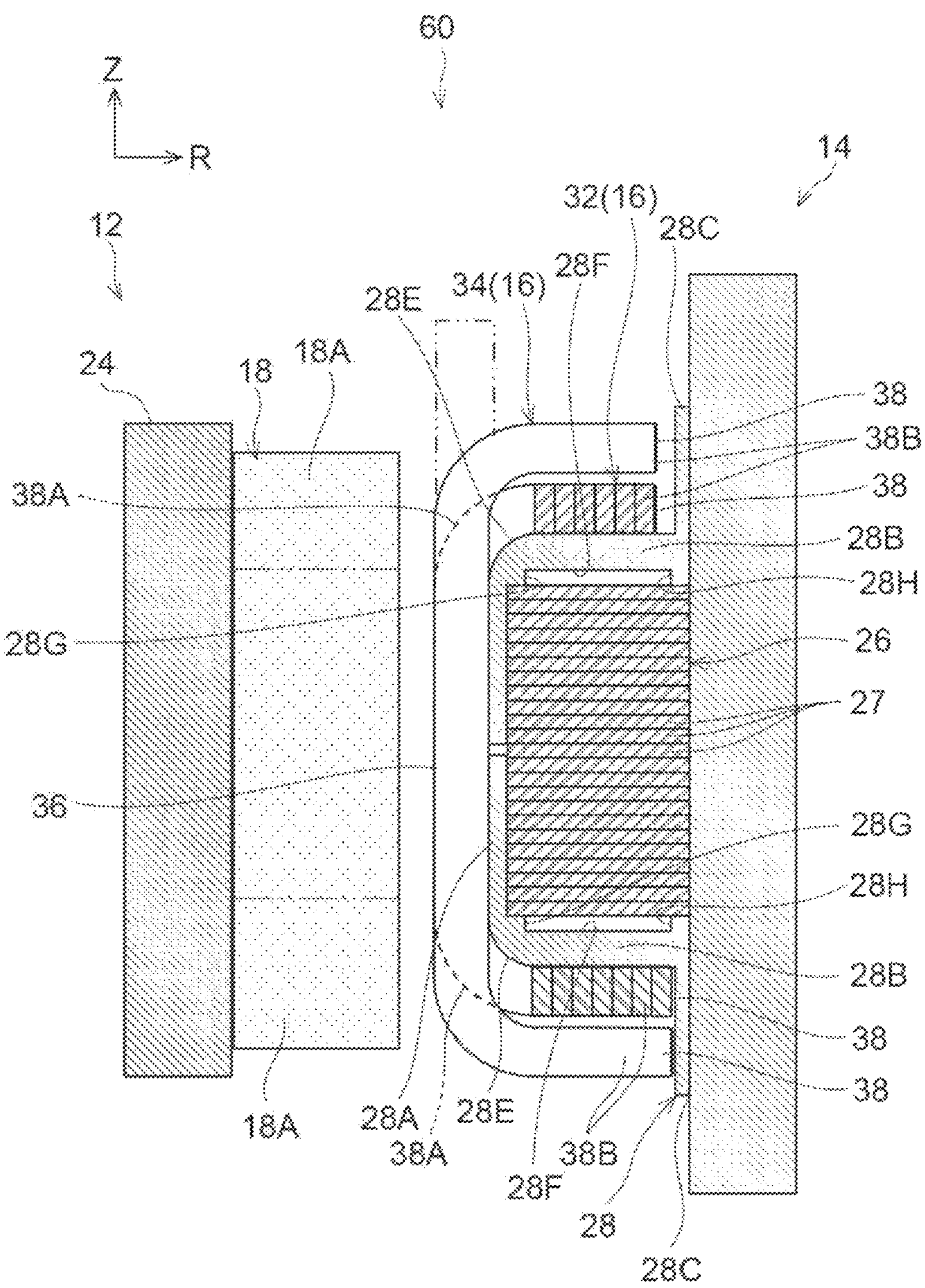
FIG. 15A is an enlarged axial sectional view illustrating a part of a stator and a part of a rotor according to the third embodiment.

The following describes a motor 60 according to the third embodiment of the present disclosure with reference to FIG. 15A. To selected components and parts of the motor 60 of the third embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 60 may be omitted.

The configuration of the motor 60 of the third embodiment is substantially identical to the configuration of the motor 10 except for that the configuration of each of the first and second end-surface cover members 28B according to the third embodiment is different from that according to the first embodiment.

The first end-surface cover member 28B has an inner surface facing the stator core 26. The insulator 28 has a first void 28F formed in the inner surface of the first end-surface cover member 28B to extend in the circumferential direction. Similarly, the second end-surface cover member 28B has an inner surface facing the stator core 26. The insulator 28 has a second void 28F formed in the inner surface of the second end-surface cover member 28B to extend in the circumferential direction. This enables the first end-surface cover member 28B to be separated through the first void 28F from the stator core 26, and enables the second end-surface cover member 28B to be separated through the second void 28F from the stator core 26.

Specifically, the inner surface of the first end-surface cover member 28B has formed thereon a radially inner edge 28G defined as an inner periphery of the first void 28F, and has formed thereon a radially outer edge 28H defined as an outer periphery of the first void 28F. The radially inner and outer edges 28G and 28H of the first end-surface cover member 28B are disposed in contact with the first end surface of the stator core 26 in the axial direction.

Similarly, the inner surface of the second end-surface cover member 28B has formed thereon a radially inner edge 28G defined as an inner periphery of the second void 28F, and has formed thereon a radially outer edge 28H defined as an outer periphery of the second void 28F. The radially inner and outer edges 28G and 28H of the second end-surface cover member 28B are disposed in contact with the second end surface of the stator core 26 in the axial direction.

The radially inner and outer edges 28G and 28H of the first end-surface cover member 28B, which is adjacent to the first void 28F, and the radially inner and outer edges 28G and 28H of the second end-surface cover member 28B, which is adjacent to the second void 28F, are operative to determine the position of the insulator 28 relative to the stator core 26 in the axial direction.

The radially inner and outer edges 28G and 28H of the first end-surface cover member 28B of the insulator 28, which are located adjacent to the first void 28F, are disposed on the first end surface of the stator core 26 in the axial direction. Additionally, the radially inner and outer edges 28G and 28H of the second end-surface cover member 28B of the insulator 28, which are located adjacent to the second void 28F, are disposed on the second end surface of the stator core 26 in the axial direction.

This configuration of the motor 60 enables magnetic flux, which has introduced into the soft-magnetic members 52 contained in the insulator 28, to be introduced into the stator core mainly through the radially inner edges 28G located adjacent to the respective first and second voids 28F. This results in a smaller area of magnetic-flux flow-in/flow-out portions of the insulator 26 to/from the stator core 26, making it possible to reduce iron loss, mainly such as eddy-current loss, generated in the stator core 26.

The configuration of each of the first and second voids 28F is not limited to the configuration illustrated in FIG. 15A. Specifically, only one of the radially inner and outer edges 28G and 28H of the first end-surface cover member 28B of the insulator 28, which are located adjacent to the first void 28F, can be disposed on the first end surface of the stator core 26 in the axial direction, and only one of the radially inner and outer edges 28G and 28H of the second end-surface cover member 28B of the insulator 28, which are located adjacent to the second void 28F, can be disposed on the second end surface of the stator core 26 in the axial direction.

Figure 15B:
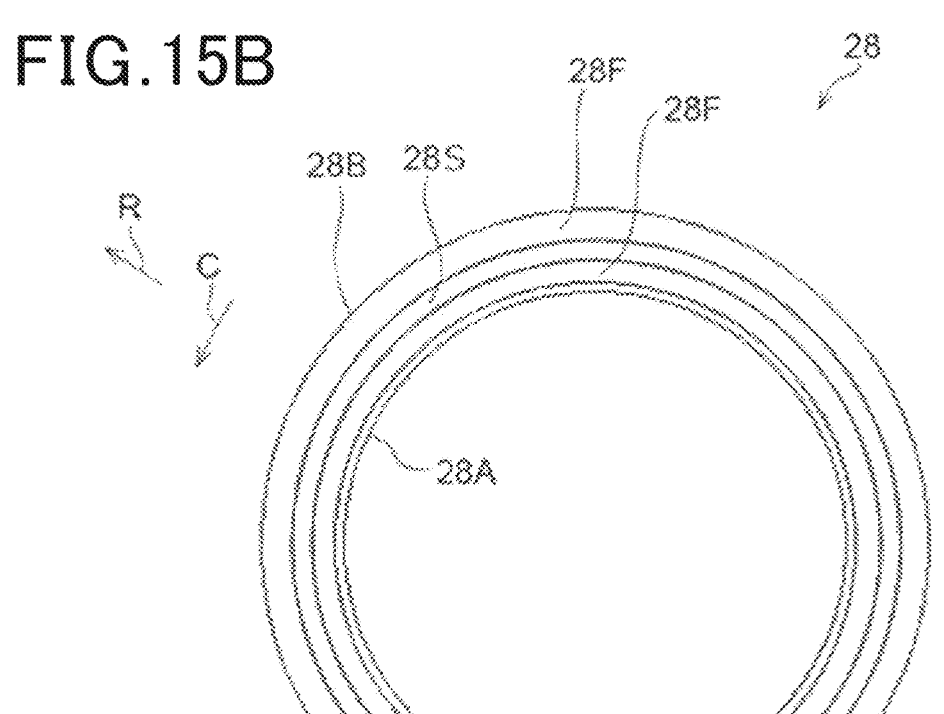
FIG. 15B is a plan view of the insulator when viewed from a surface side of the insulator on which voids according to a first additional example are defined.

FIG. 15B illustrates a first additional example of the configuration of each of the first and second voids 28F.

As illustrated in FIG. 15B, a radially middle portion of the inner surface of the first end-surface cover member 28B protrudes as a first projection 28S toward the first end surface of the stator core 26 in the axial direction and extends in the circumferential direction to have an annular shape in view of the axial direction. A radially middle portion of the inner surface of the second end-surface cover member 28B protrudes as a second projection 28S toward the second end surface of the stator core 26 in the axial direction and extends in the circumferential direction to have an annular shape in view of the axial direction. The first projection 28S of the inner surface of the first end-surface cover member 28B defines first voids 28F adjacently on both sides of the first projection 28S, and the second projection 28S of the inner surface of the second end-surface cover member 28B defines second voids 28F adjacently on both sides of the second projection 28S. That is, the first projection 28S of the inner surface of the first end-surface cover member 28B abuts onto the first end surface of the stator core 26 in the axial direction, and the second projection 28S of the inner surface of the second end-surface cover member 28B abuts onto the second end surface of the stator core 26 in the axial direction.

Figure 15C:
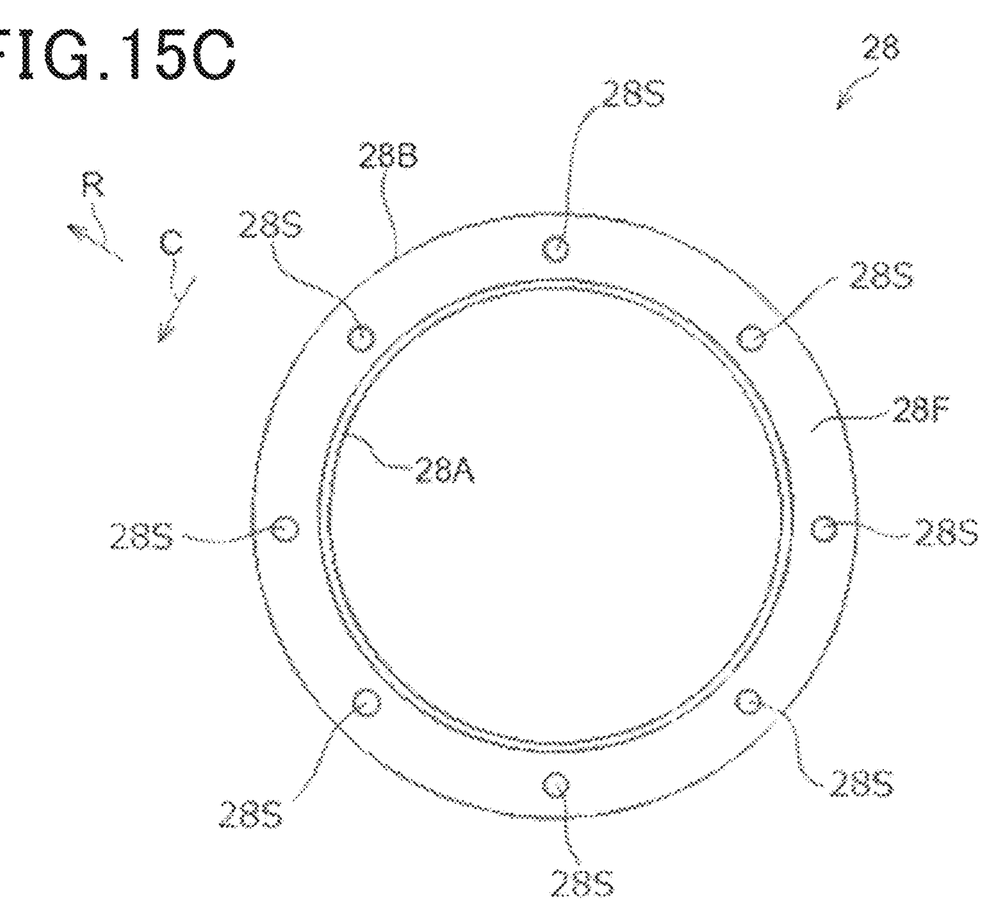
FIG. 15C is a plan view of the insulator when viewed from a surface side of the insulator on which voids according to a second additional example are defined.

FIG. 15C illustrates a second additional example of the configuration of each of the first and second voids 28F.

As illustrated in FIG. 15C, the inner surface of the first end-surface cover member 28B has formed thereon a plurality of first projections 28S arranged in the circumferential direction with intervals therebetween. Each of the first projections 28S has a substantially cylindrical shape along the axial direction, and projects toward the first end surface of the stator core 26 in the axial direction. Similarly, the inner surface of the second end-surface cover member 28B has formed thereon a plurality of second projections 28S arranged in the circumferential direction with intervals therebetween. Each of the second projections 28S has a substantially cylindrical shape along the axial direction, and projects toward the second end surface of the stator core 26 in the axial direction. The first projections 28S of the inner surface of the first end-surface cover member 28B define first voids 28F therearound, and the second projections 28S of the inner surface of the second end-surface cover member 28B define second voids 28F therearound. That is, the first projections 28S of the inner surface of the first end-surface cover member 28B abut onto the first end surface of the stator core 26 in the axial direction, and the second projections 28S of the inner surface of the second end-surface cover member 28B abut onto the second end surface of the stator core 26 in the axial direction.

Figure 15D:
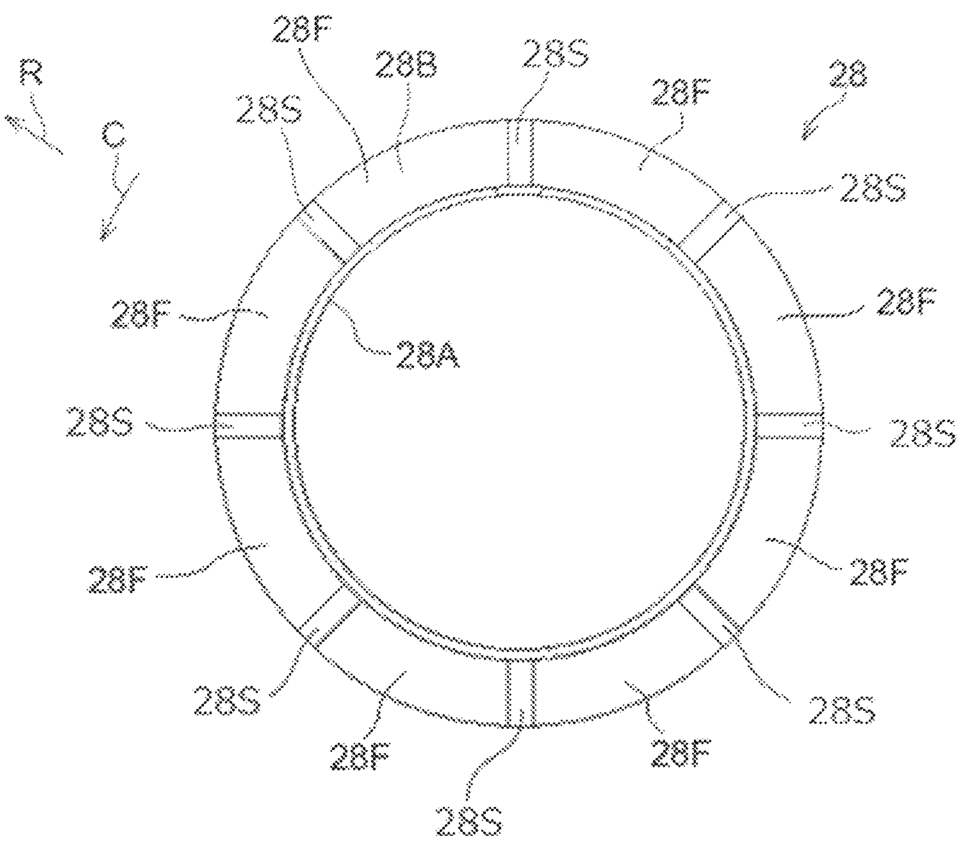
FIG. 15D is a plan view of the insulator when viewed from a surface side of the insulator on which voids according to a third additional example are defined.

FIG. 15D illustrates a third additional example of the configuration of each of the first and second voids 28F.

As illustrated in FIG. 15D, the inner surface of the first end-surface cover member 28B has formed thereon a plurality of first projections 28S arranged in the circumferential direction with intervals therebetween. Each of the first projections 28S extends in the corresponding radial direction in view of the axial direction, and projects toward the first end surface of the stator core 26 in the axial direction. Similarly, the inner surface of the second end-surface cover member 28B has formed thereon a plurality of second projections 28S arranged in the circumferential direction with intervals therebetween. Each of the second projections 28S extends in the corresponding radial direction in view of the axial direction, and projects toward the second end surface of the stator core 26 in the axial direction. The first projections 28S of the inner surface of the first end-surface cover member 28B define first voids 28F therearound, and the second projections 28S of the inner surface of the second end-surface cover member 28B define second voids 28F therearound. That is, the first projections 28S of the inner surface of the first end-surface cover member 28B abut onto the first end surface of the stator core 26 in the axial direction, and the second projections 28S of the inner surface of the second end-surface cover member 28B abut onto the second end surface of the stator core 26 in the axial direction.

Fourth Embodiment

Figure 16:
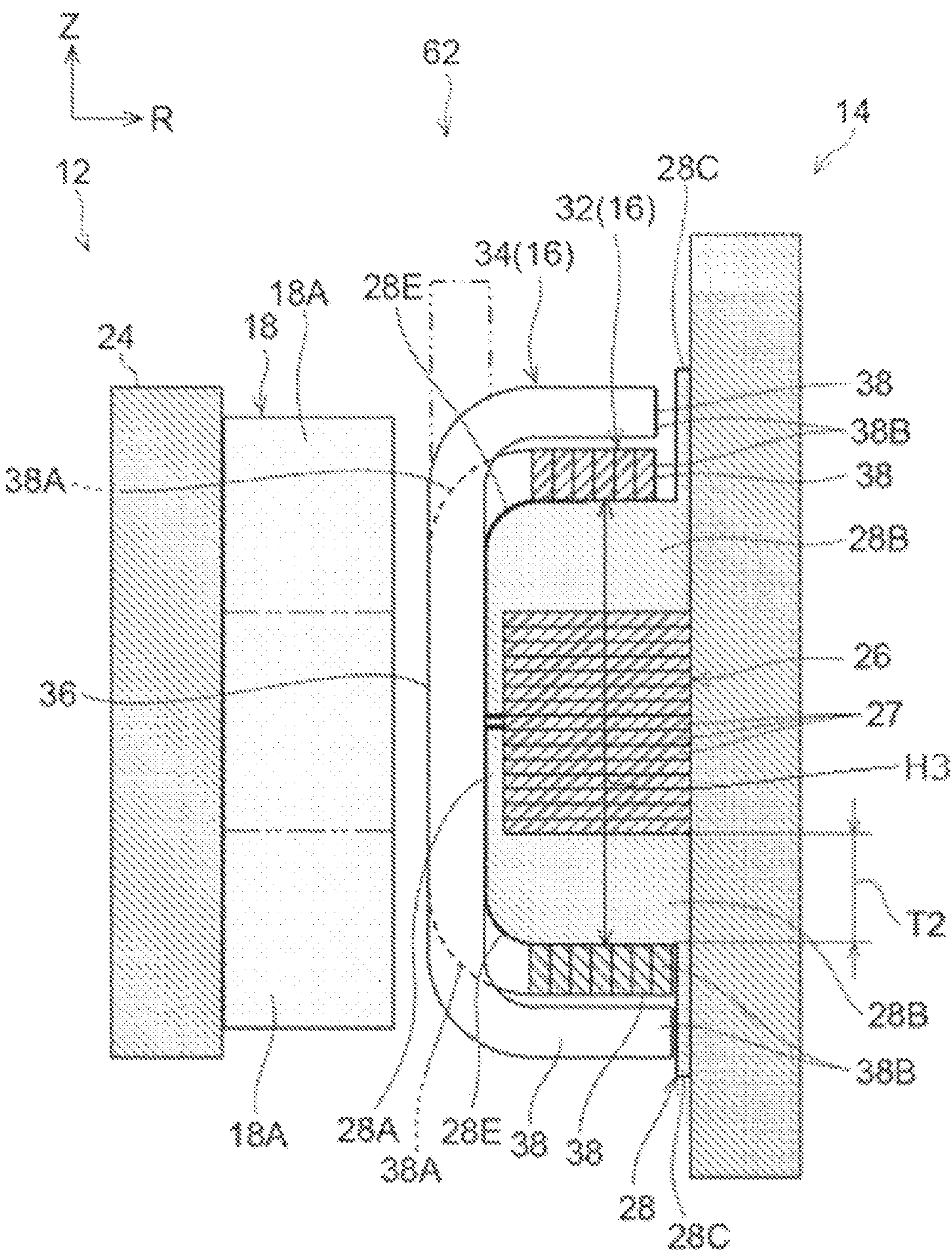
FIG. 16 is an enlarged axial sectional view illustrating a part of a stator and a part of a rotor according to the fourth embodiment.
Figure 17:
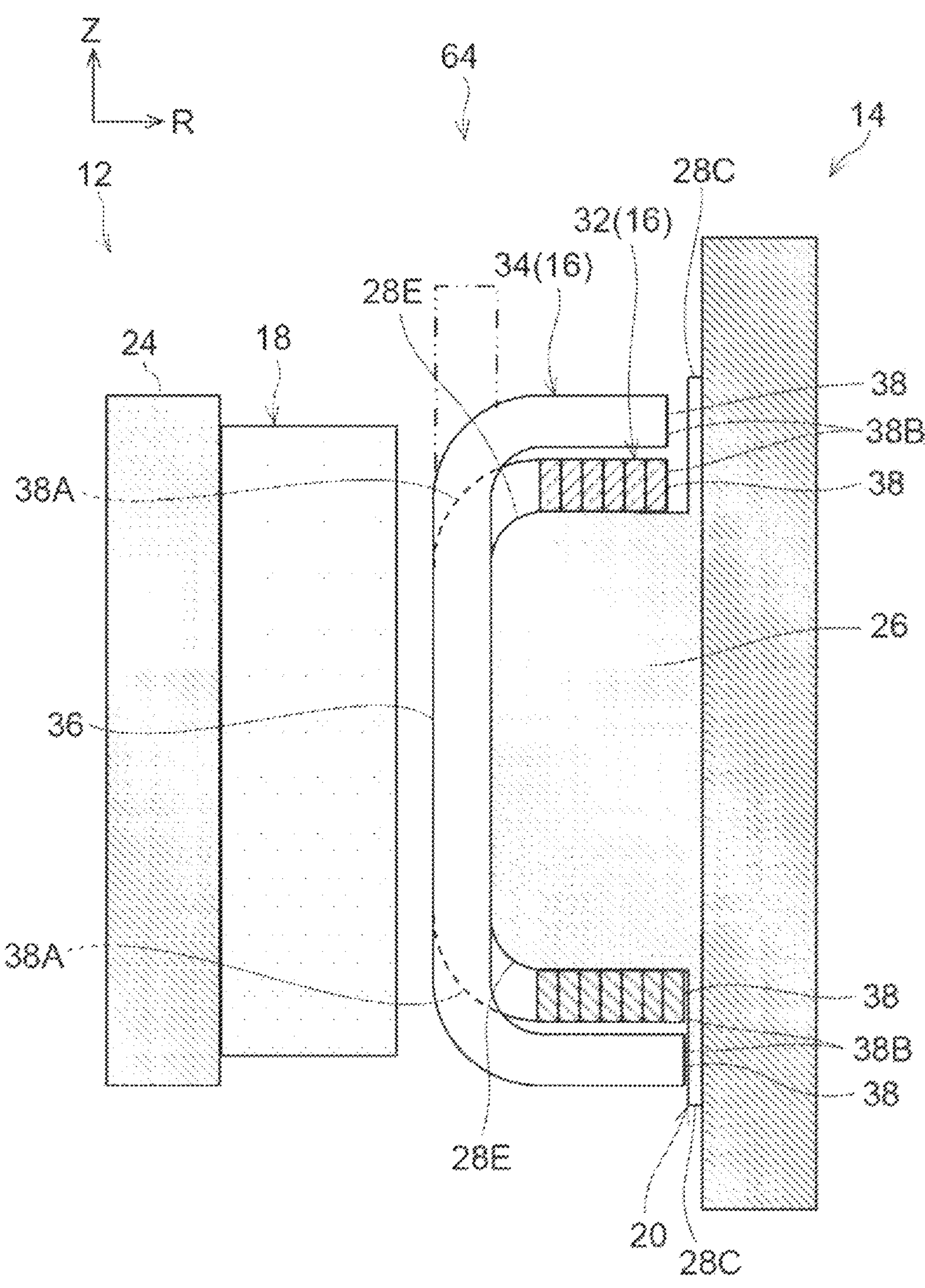
FIG. 17 is an enlarged axial sectional view illustrating a part of a stator and a part of a rotor according to the fifth embodiment.

The following describes a motor 62 according to the fourth embodiment of the present disclosure with reference to FIG. 16. To selected components and parts of the motor 62 of the fourth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 62 may be omitted.

The stator core 26 of the motor 62 according to the fourth embodiment is configured such that the number of core sheets 27 of the stator core 26 is smaller than that of core sheets 27 of the stator core 26 of the motor 10 according to the first embodiment. Like the motor 10, the whole of the insulator 28 of the motor 62 is comprised of the base 50 and the soft-magnetic members 52 contained in the base 50.

In particular, the thickness dimension T2 of each of the first and second end-surface cover members 28B of the insulator 28 according to the fourth embodiment is greater than that of each of the first and second end-surface cover members 28B of the insulator 28 according to the first embodiment. A dimension H3 defined between an outer end surface of the first end-surface cover member 28B in the axial direction and an outer end surface of the second end-surface cover member 28B in the axial direction according to the fourth embodiment is set to be identical to that according to the first embodiment.

The motor 62 of the fourth embodiment results in a reduced number of core sheets 27 constituting the stator core 26 as compared with that of the motor 10 according to the first embodiment, resulting in a lighter weight of the motor 62.

Fifth Embodiment

The following describes a motor 64 according to the fifth embodiment of the present disclosure with reference to FIG.

17. To selected components and parts of the motor 64 of the fifth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 64 may be omitted.

The configuration of the motor 64 of the fifth embodiment is substantially identical to the configuration of the motor 10 except for that the insulator 28 of the fifth embodiment, which is comprised of the base 50 and the soft-magnetic members 52 contained in the base 50, constitutes the stator core 26.

Specifically, the motor 64 is configured such that the insulator 28, which is comprised of the base 50 and the soft-magnetic members 52 contained in the base 50, constitutes the stator core 26, making it possible to reduce the number of components of the motor 64.

Additionally, the configuration of the stator core 26, which is comprised of the base 50 and the soft-magnetic members 52 contained in the base 50, results in a lighter weight of the motor 64.

Sixth Embodiment

Figure 18:
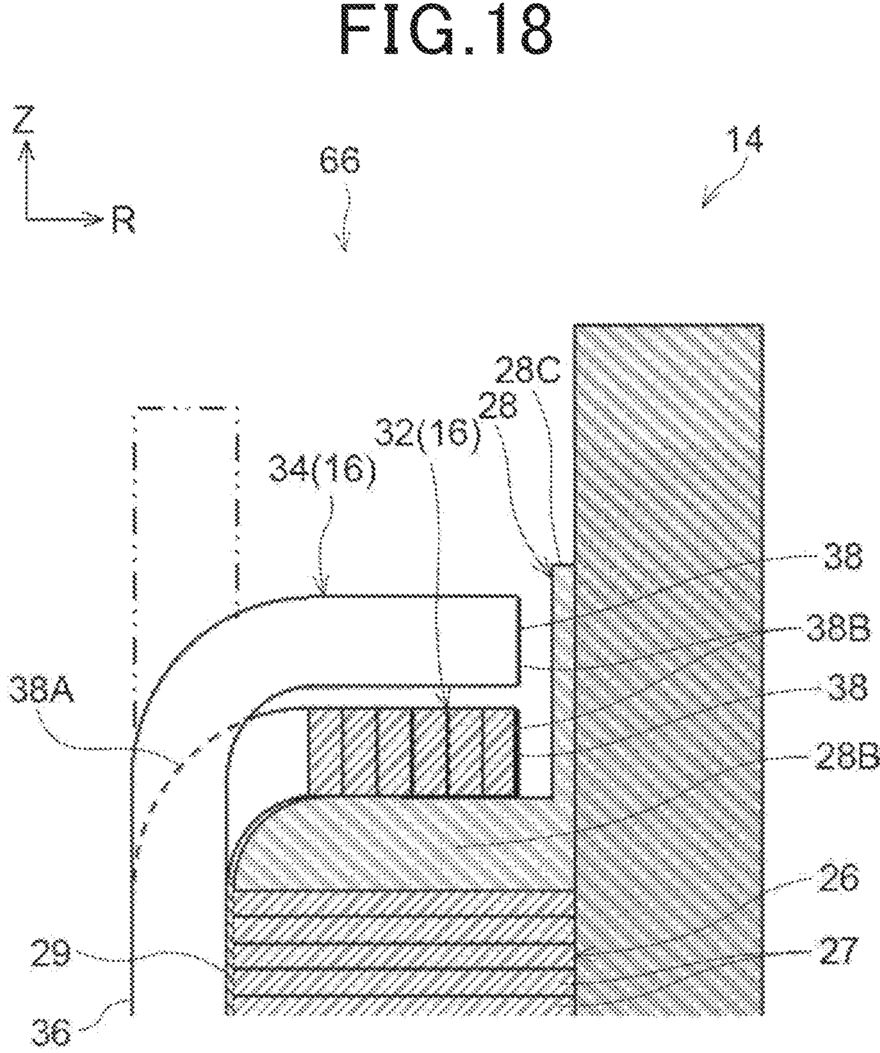
FIG. 18 is an enlarged axial sectional view illustrating a part of a stator and a part of a rotor according to the sixth embodiment.

The following describes a motor 66 according to the sixth embodiment of the present disclosure with reference to FIG. 18. To selected components and parts of the motor 66 of the sixth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 66 may be omitted.

From an insulator 28 according to the sixth embodiment, the inner-periphery cover member 28A illustrated in FIG. 8A has been eliminated. Additionally, the motor 66 includes a film insulator 29 that covers the radially inner periphery of the stator core 26 in place of the inner-periphery cover member 28A. Like the motor 10, the whole of the insulator 28 of the motor 66 is comprised of the base 50 and the soft-magnetic members 52 contained in the base 50.

The film insulator 29 has a band shape having a thickness dimension that is smaller than the thickness dimension T1 of the inner-periphery cover member 28A in the radial direction. The film insulator 29 is arranged along the radially inner periphery of the stator core 26 to cover the radially inner periphery of the stator core 26. As the film insulator 29, a thin sheet insulator can be preferably used.

The film insulator 29 of the motor 66 according to the sixth embodiment has the thickness dimension that is smaller than the thickness dimension T1 of the inner-periphery cover member 28A in the radial direction. This therefore enables the radially inner periphery of the stator core 26 to be arranged closer to the assembly of the magnets 18 by the thickness difference between the thickness dimension of the film insulator 29 and that of the inner-periphery cover member 28A. This therefore results in a magnetic gap between the stator core 26 and the assembly of the magnets 18 being smaller, leading to a further increase in the output torque of the motor 66 and a further reduction in the size of the motor 66.

Seventh Embodiment

Figure 19:
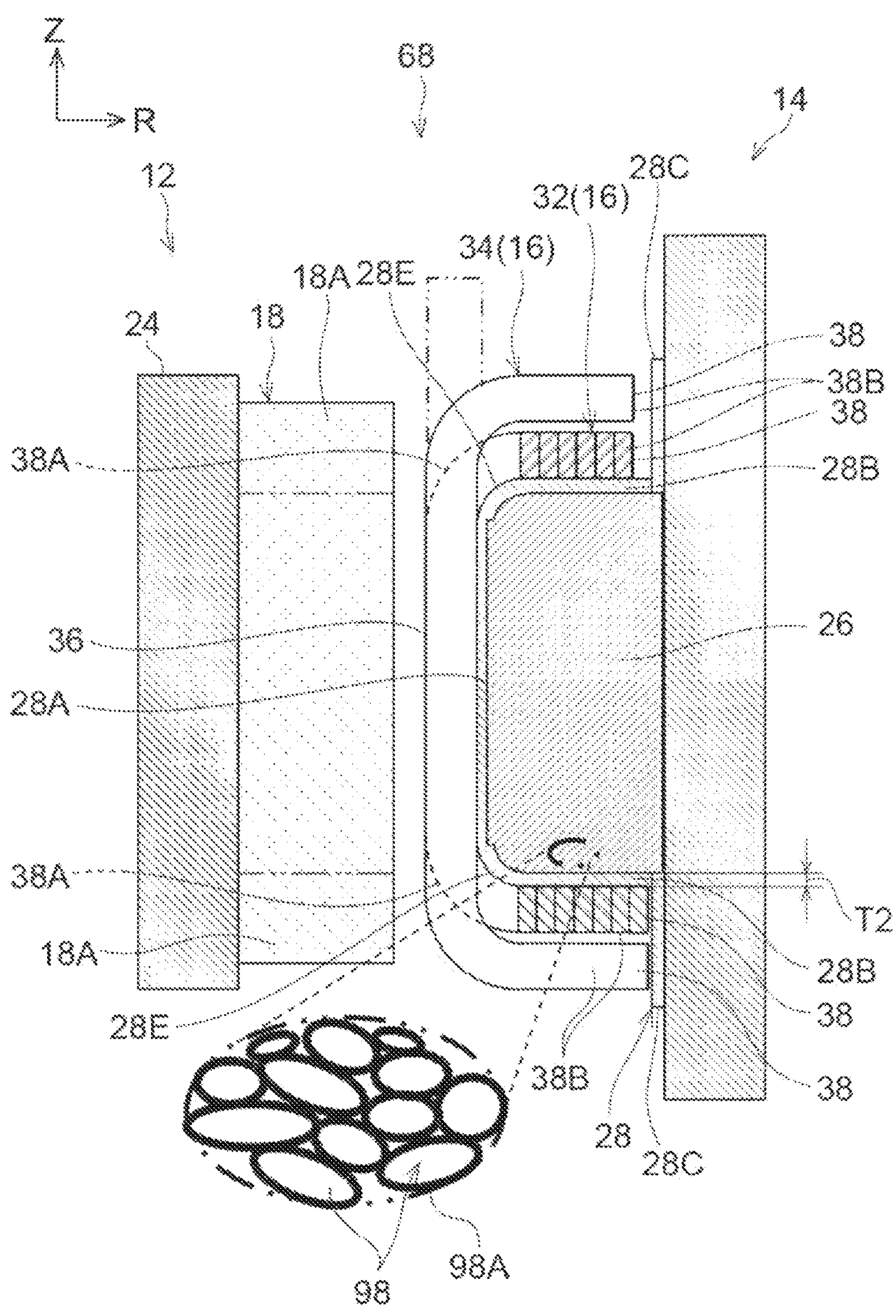
FIG. 19 is an enlarged axial sectional view illustrating a part of a stator and a part of a rotor according to the seventh embodiment.

The following describes a motor 68 according to the seventh embodiment of the present disclosure with reference to FIG. 19. To selected components and parts of the motor 68 of the seventh embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 68 may be omitted.

The configuration of the motor 68 of the seventh embodiment is substantially identical to the configuration of the motor 10 except for the following different points.

Specifically, the first different point is that an insulator 28 according to the seventh embodiment is comprised of compressed magnetic particles 98. The second different point is that the thickness dimension T2 of each of the first and second end-surface cover members 28B included in the motor 68 according to the seventh embodiment is smaller than that of the motor 10. The third different point is that the insulator 28 of the motor 68 according to the seventh embodiment is configured as an axially undivided single-layer insulator 28. Like the motor 10, the whole of the insulator 28 of the motor 68 is comprised of the base 50 and the soft-magnetic members 52 contained in the base 50.

Specifically, the insulator 28 according to the seventh embodiment is comprised of a compressed-powder magnetic core produced by compressing the magnetic particles 98, each of which is coated with an insulating coating 98A.

The motor 68 of the seventh embodiment configured set forth above therefore has a higher level of the output torque of the motor 10 with a smaller size.

Eighth Embodiment

Figure 20:
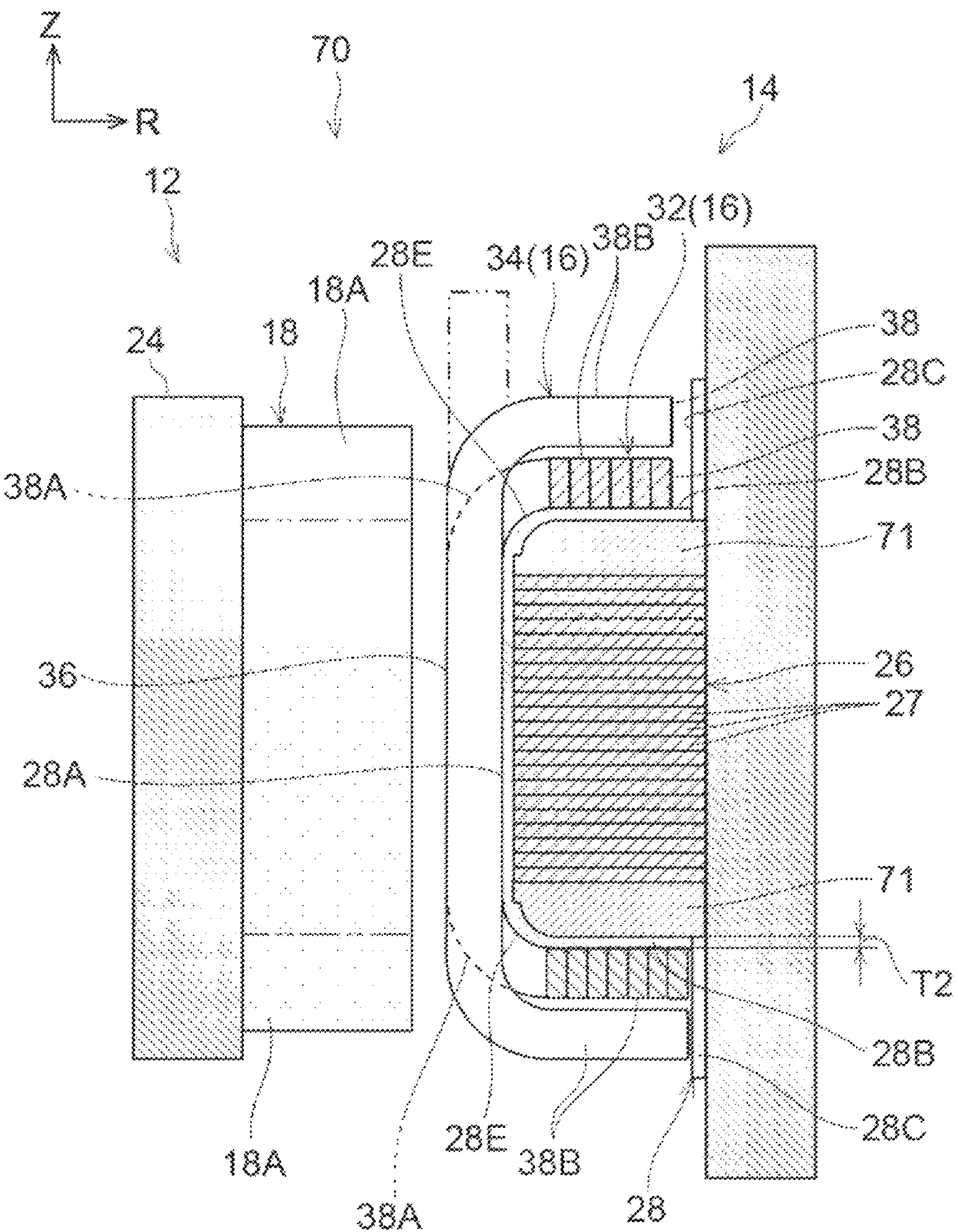
FIG. 20 is an enlarged axial sectional view illustrating a part of a stator and a part of a rotor according to the eighth embodiment.

The following describes a motor 70 according to the eighth embodiment of the present disclosure with reference to FIG. 20. To selected components and parts of the motor 70 of the eighth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 70 may be omitted.

The configuration of the motor 70 of the eighth embodiment is substantially identical to the configuration of the motor 10 except for the following different points.

Specifically, the first different point is that a part of a stator core 26 of the eighth embodiment is configured as an integrally molded member 71 formed of a soft-magnetic material or a material containing a soft-magnetic material. The second different point is that the thickness dimension T2 of each of the first and second end-surface cover members 28B included in the motor 70 according to the eighth embodiment is smaller than that of the motor 10. The third different point is that the insulator 28 of the motor 70 is configured as an axially undivided single-layer insulator 28. Like the motor 10, the whole of the insulator 28 of the motor 70 is comprised of the base 50 and the soft-magnetic members 52 contained in the base 50.

In particular, the stator core 26 of the eighth embodiment has first and second ends in the axial direction, and the first and second ends of the stator core 26 in the axial direction are configured as the integrally molded members 71, each of which is formed of a soft-magnetic material or a material containing a soft-magnetic material. For example, casting, forging, or cutting of an iron-based steel material enables the integrally molded members 71 to be formed on the stator core 26. Alternatively, compression molding and sintering of iron-based powders enables the integrally molded members 71 to be formed on the stator core 26. Alternatively, injection molding or compression molding of a resin containing iron-based powders enables the integrally molded members 71 to be formed on the stator core 26. Alternatively, molding such a compressed-powder magnetic core disclosed as the motor 68 of the seventh embodiment enables the integrally molded members 71 to be formed on the stator core 26. Stacking steel sheets whose inner diameter is different from that of the steel sheets used for the stator core 26 enables the integrally molded members 71 to be formed on the stator core 26.

The motor 70 of the eighth embodiment configured set forth above therefore has a higher level of the output torque of the motor 10 with a smaller size.

Ninth Embodiment

Figure 21:
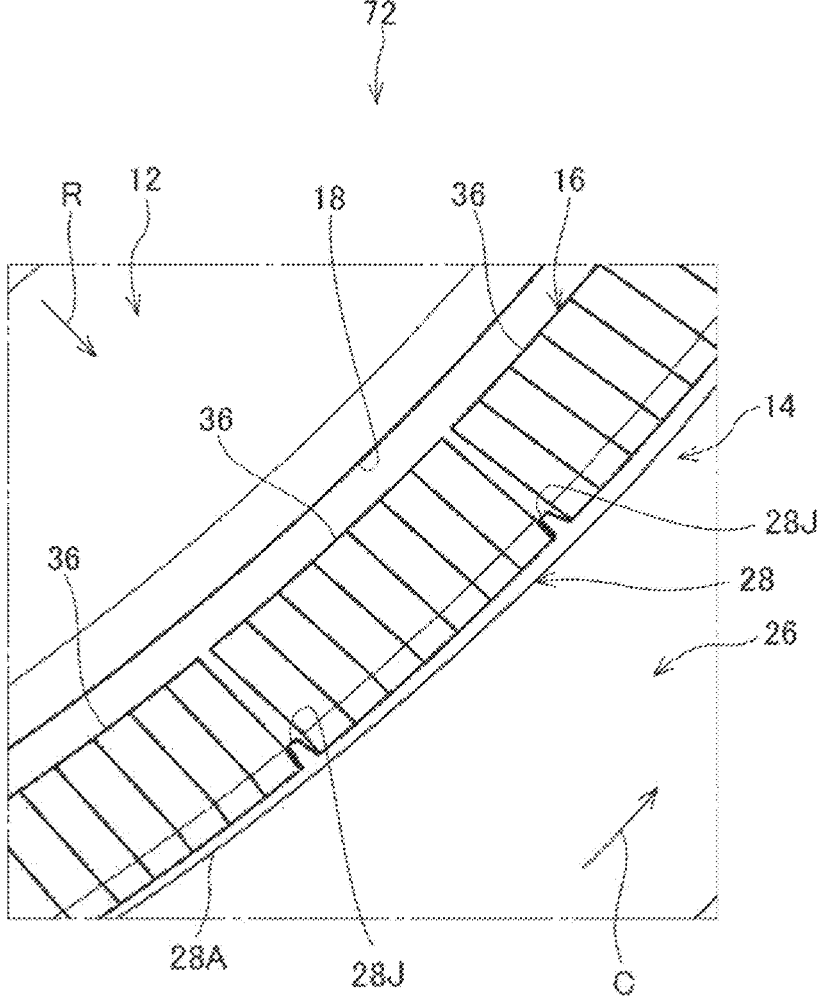
FIG. 21 is an enlarged transverse sectional view illustrating a part of a stator and a part of a rotor according to the ninth embodiment.

The following describes a motor 72 according to the ninth embodiment of the present disclosure with reference to FIG. 21. To selected components and parts of the motor 72 of the ninth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 72 may be omitted.

The configuration of the motor 72 of the ninth embodiment is substantially identical to the configuration of the motor 10 except for that an insulator 28 according to the ninth embodiment includes a plurality of intervening protrusions 28J.

The intervening protrusions 28J are integrally formed on the inner surface of the inner-periphery cover member 28A to protrude therefrom radially inward, i.e., toward the coil side. Additionally, the intervening protrusions 28J are arranged in the circumferential direction with regular intervals therebetween. Each intervening protrusion 28J is disposed to intervene between a corresponding selected adjacent pair of the facing portions of the coils 16. Like, for example, the inner-periphery cover member 28A, each intervening protrusion 28J is comprised of the base 50 and the soft-magnetic members 52 contained in the base 50.

The motor 72 of the ninth embodiment described above enables each intervening protrusion 28J of the insulator 28 to be arranged closer to the assembly of the magnets 18. This therefore results in a magnetic gap between the insulator 28 and the assembly of the magnets 18 to be smaller, leading to a further increase in the output torque of the motor 72 and a further reduction in the size of the motor 72.

Tenth Embodiment

Figure 22:
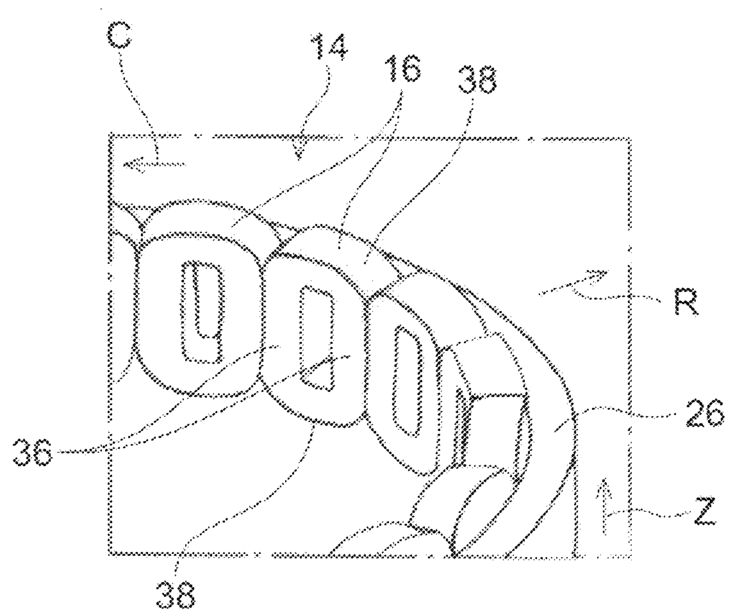
FIG. 22 is a perspective view illustrating a stator core and coils of a stator constituting a motor according to the tenth embodiment.
Figure 23:
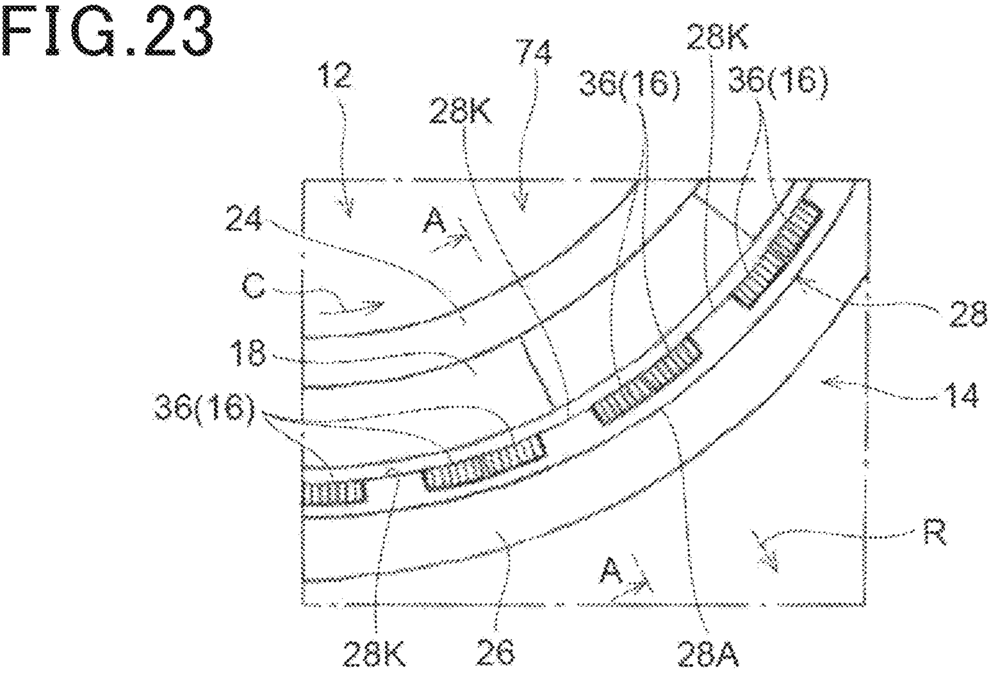
FIG. 23 is a transverse sectional view of a rotor and the stator of the motor according to the tenth embodiment.
Figure 24:
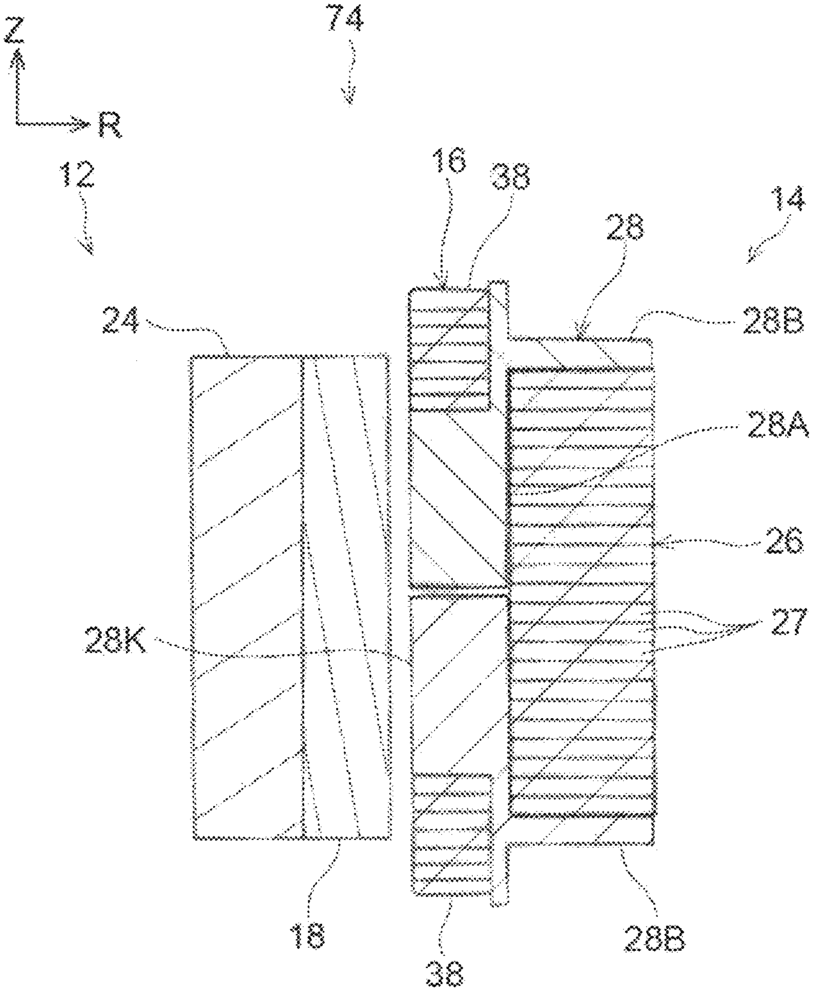
FIG. 24 is a sectional view taken along line A-A of FIG. 23.

The following describes a motor 74 according to the tenth embodiment of the present disclosure with reference to FIGS. 22, 23, and 24. To selected components and parts of the motor 74 of the tenth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 74 may be omitted. In particular, hatching of sections are omitted in FIG. 23.

The motor 74 of the tenth embodiment includes a plurality of coils 16. Each of the coils 16 has opposing first and second coil end portions 38 in the axial direction, and each of the first and second coil end portions 38 of each coil 16 extends straight without being bent with respect to the first and second facing portions 36. The coils 16 are arranged along the radially inner periphery of the stator core 26. In FIG. 22, illustration of the insulator 28 is omitted. In particular, the motor 74 of the tenth embodiment, which is different from the motor 10, is configured such that the first facing portion 36 or the second facing portion 36 of each coil 16 is not interposed between the first and second facing portions 36 of either of the adjacent coils 16. In other words, the first facing portion 36 or the second facing portion 36 of each coil 16 is arranged to be circumferentially adjacent to the second facing portion 36 or the first facing portion 36 of either of the adjacent coils 16.

The insulator 28 includes, as illustrated in FIGS. 23 and 24, bobbin members 28K. Each of the bobbin members 28K protrudes from an axially center portion of the inner-periphery cover member 28A radially inward. The bobbin members 28K are circumferentially arranged with regular intervals therebetween. The number of bobbin members 28K is set to be identical to the number of coils 16. That is, the winding 30 of each coil 16 is wound around the corresponding bobbin member 28K, so that each bobbin 28K is disposed in a space defined inside the corresponding coil 16. Like, for example, the inner-periphery cover member 28A, each bobbin member 28K is comprised of the base 50 and the soft-magnetic members 52 contained in the base 50.

The motor 74 of the tenth embodiment described above enables each bobbin member 28K of the insulator 28 to be arranged closer to the assembly of the magnets 18. This therefore results in a magnetic gap between the insulator 28 and the assembly of the magnets 18 to be smaller, leading to a further increase in the output torque of the motor 74 and a further reduction in the size of the motor 74.

Eleventh Embodiment

Figures 25, 26:
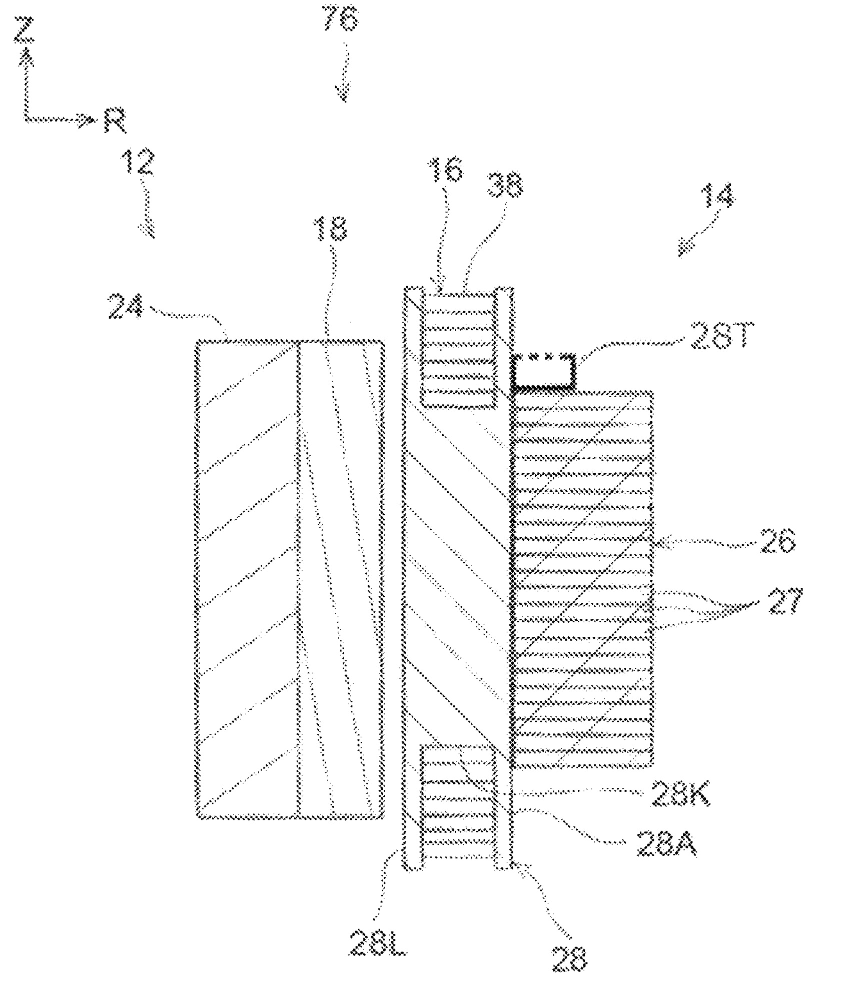
FIG. 25 is a transverse sectional view of a rotor and a stator of the motor according to the eleventh embodiment.
FIG. 26 is a sectional view taken along line B-B of FIG. 25.
Figure 27:
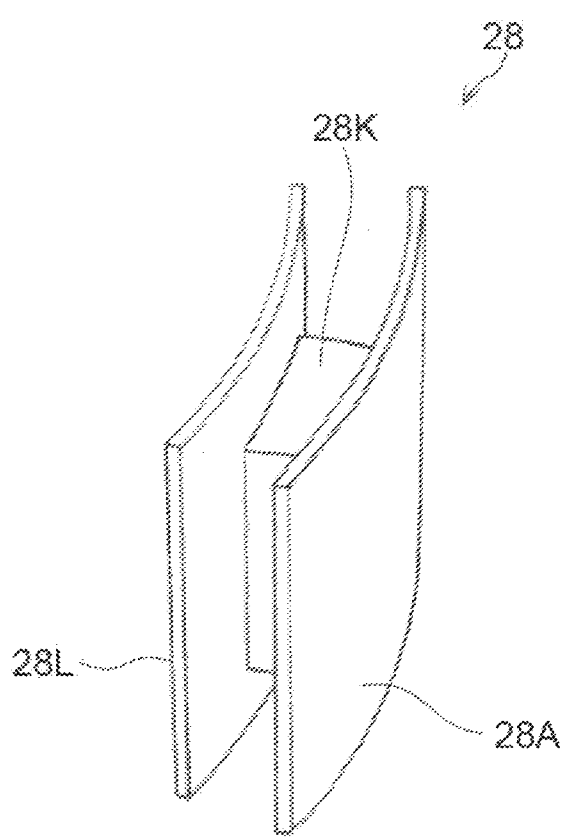
FIG. 27 is a perspective view illustrating an insulator constituting a part of the motor according to the eleventh embodiment.

The following describes a motor 76 according to the eleventh embodiment of the present disclosure with reference to FIGS. 25, 26, and 27. To selected components and parts of the motor 76 of the eleventh embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 76 may be omitted. In particular, hatching of sections are omitted in FIG. 25.

The configuration of the motor 76 of the eleventh embodiment is substantially identical to the configuration of the motor 74 of the tenth embodiment except for that the motor 76 includes an insulator 28 comprised of a plurality of segments; these segments will be referred to as insulator segments 28. The number of insulator segments 28 is identical to the number of coils 16. Each insulator segment 28 is comprised of an inner-periphery cover member 28A, a bobbin member 28K, and an inside extending support 28L.

The inner-periphery cover member 28A has a dimension in the axial direction that is greater than a dimension of the stator core 26 in the axial direction. The inside extending support 28L is located radially inside the inner-periphery cover member 28A to extend in parallel to the inner-periphery cover member 28A. The bobbin member 28K radially joins a circumferentially and axially center portion of the inner-periphery cover member 28A and a circumferentially and axially center portion of the inside extending support 28L. The winding 30 of each coil 16 is wound around the bobbin member 28*k* of the corresponding insulator segment 28, so that each coil 16 is disposed around the bobbin member 28K of the corresponding insulator segment 28. Each insulator segment 28 is comprised of the base 50 and the soft-magnetic members 52 contained in the base 50.

The motor 76 of the eleventh embodiment described above enables the inside extending support 28L of each insulator segment 28 to be arranged closer to the assembly of the magnets 18. This therefore results in a magnetic gap between the assembly of insulator segments 28 and the assembly of the magnets 18 to be smaller, leading to a further increase in the output torque of the motor 76 and a further reduction in the size of the motor 76.

Each insulator segment 28 can include a plurality of convex protrusions 28T (see dash-double-dot lines in FIG. 26) or stepped portions formed on a radially outer periphery of the inner-periphery cover member 28A. The convex protrusions 28T or stepped portions enable the axial positions of the coils 16 and insulator segments 28 with respect to the stator core 26 to be defined. The convex protrusions 28T can be formed throughout or partly on the radially outer periphery of the inner-peripheral cover member 28A in the circumferential direction.

For each insulator segment 28, the inner-periphery cover member 28A, the bobbin member 28K, and the inside extending support 28L can be integrally produced, or partially produced and thereafter integrally combined with one another.

Twelfth Embodiment

Figure 28:
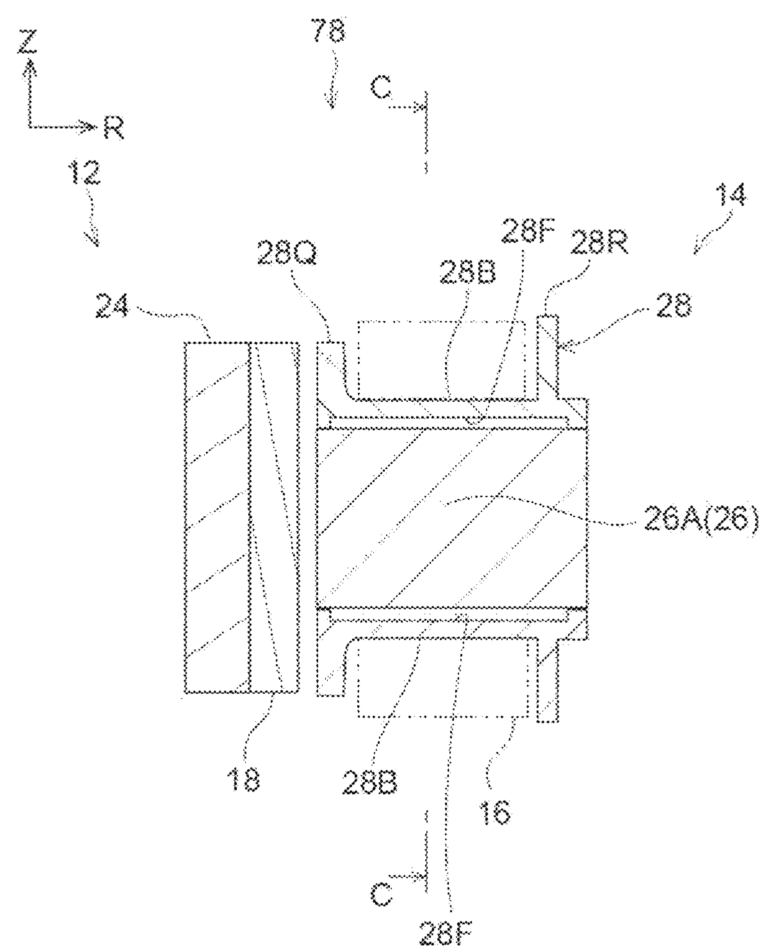
FIG. 28 is an axial sectional view illustrating a stator and a rotor according to the twelfth embodiment.
Figure 29:
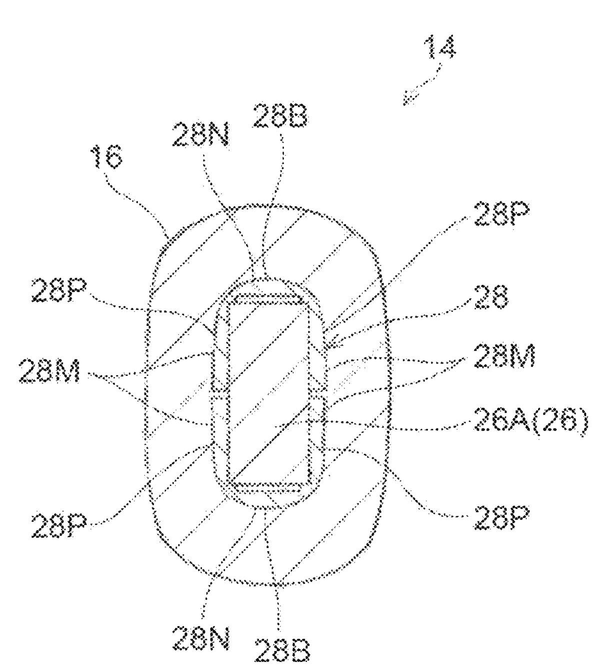
FIG. 29 is a sectional view taken along line C-C of FIG. 28.

The following describes a motor 78 according to the twelfth embodiment of the present disclosure with reference to FIGS. 28 and 29. To selected components and parts of the motor 78 of the twelfth embodiment, which are substantially identical to corresponding components and parts of the motor 10 of the first embodiment, the same or equivalent reference characters used by the corresponding components and parts of the motor 10 are assigned, and therefore, descriptions of the selected components and parts of the motor 78 may be omitted.

The motor 78 of the twelfth embodiment includes a stator core 26 that includes a plurality of teeth 26A, and each coil 16 is wound around the corresponding one of the teeth 26A. Each of the teeth 26A has opposing axial end surfaces in the axial direction, and circumferential end surfaces in the circumferential direction.

The insulator 28 includes axial end-surface cover portions 28B provided for each tooth 26A and located along the respective axial end surfaces of the corresponding tooth 26A. The insulator 28 also includes circumferential end-surface cover portions 28M provided for each tooth 26A and located along the respective circumferential end surfaces of the corresponding tooth 26A.

The winding 30 constituting each coil 16 is wound around the axial end-surface cover portions 28B and the circumferential end-surface cover portions 28M provided for the corresponding tooth 26A. In particular, each of the axial end-surface cover portions 28B has opposing outer and inner surfaces, the outer surface of which faces the coil 16, and each of the circumferential end-surface cover portions 28M has opposing outer and inner surfaces, the outer surface of which faces the coil 16. The outer surface of each of the axial end-surface cover portions 28B is convexly curved toward the coil 16 to serve as a curved surface 28N. Similarly, the outer surface of each of the circumferential end-surface cover portions 28M is convexly curved toward the coil 16 to serve as a curved outer surface 28P. This enables the shape of the curved outer surface 28N of each of the axial end-surface cover portions 28B to be in conformity with the inner shape of the wound wiring 30 of the corresponding coil 16, and also enables the shape of the curved outer surface 28P of each of the circumferential end-surface cover portions 28M to be in conformity with the inner shape of the wound wiring 30 of the corresponding coil 16.

The insulator 28 includes inside positioning members 28Q and outside positioning members 28R. Each of the inside positioning members 28Q and outside positioning members 28R is configured to determine the radial position of the corresponding one of the coils 16. The whole of the insulator 28 of the motor 78 is comprised of the base 50 and the soft-magnetic members 52 contained in the base 50.

The configuration of the motor 78 of the twelfth embodiment results in a further increase in the output torque of the motor 78 and a further reduction in the size of the motor 78.

Figure 30:
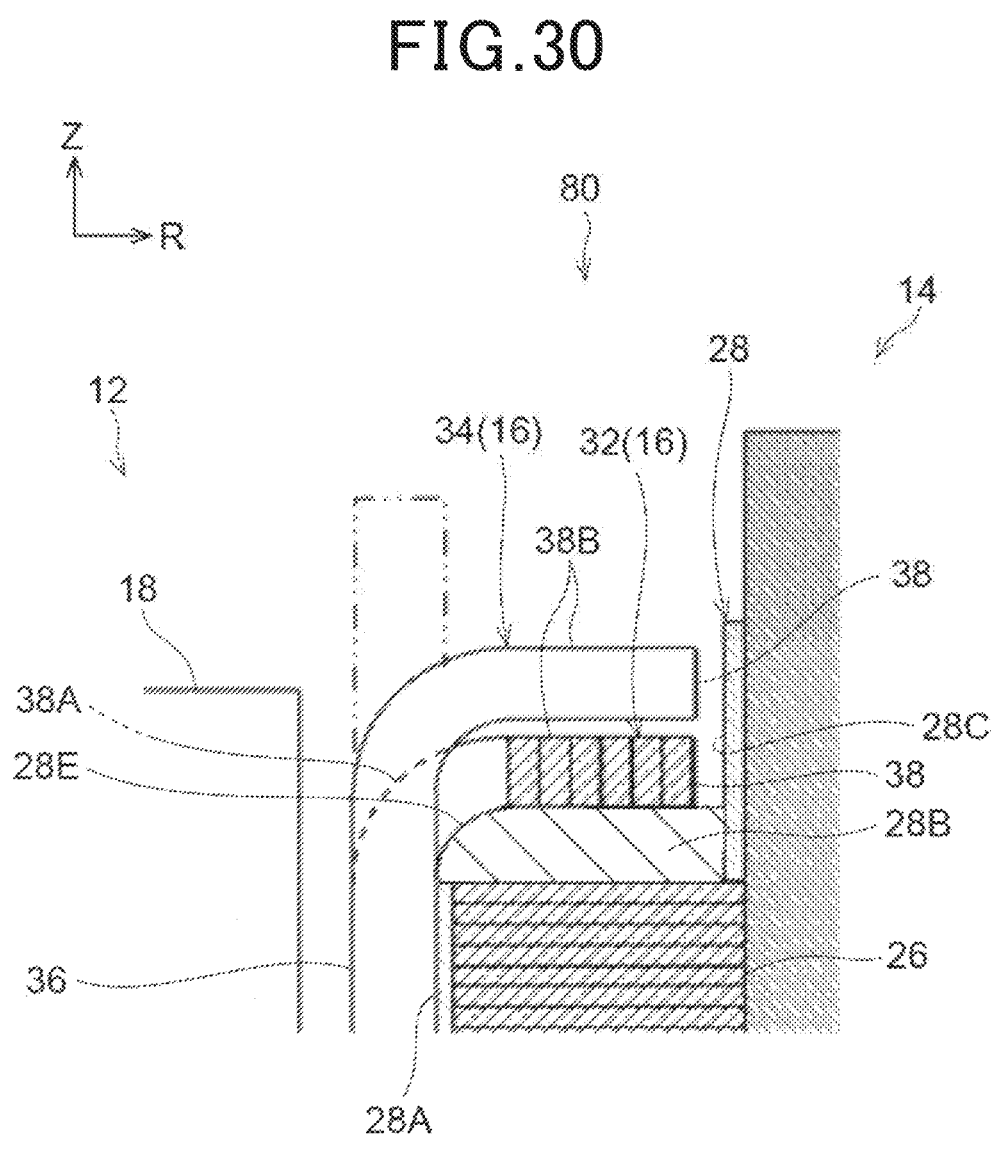

The whole of the insulator 28 according to each of the embodiments is comprised of the base 50 and the soft-magnetic members 52 contained in the base 50, but the present disclosure is not limited thereto. Specifically, a part of the insulator 28 can be comprised of, as illustrated in each of FIGS. 30 and 31, the base 50 and the soft-magnetic members 52 contained in the base 50.

Figure 31:
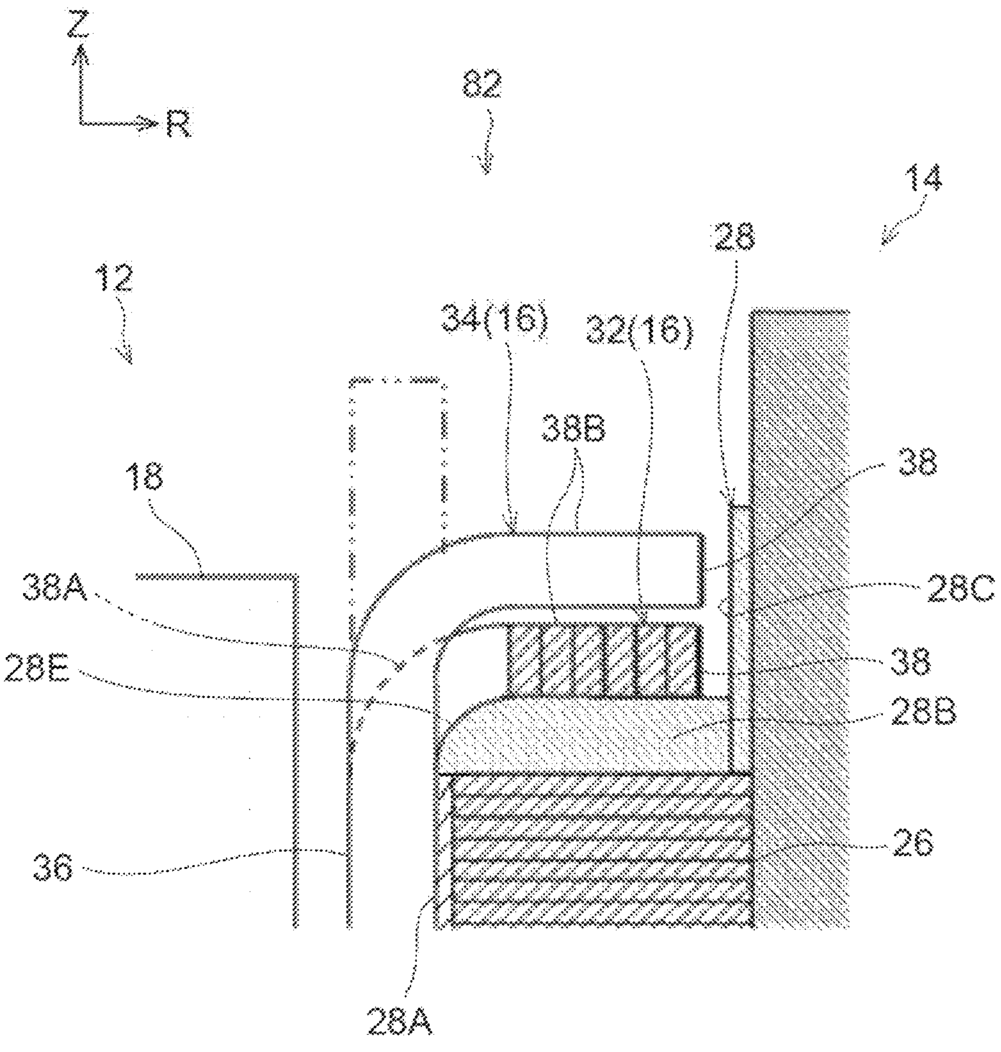
FIG. 31 is an enlarged transverse sectional view illustrating a part of a stator and a part of a rotor according to the fourteenth embodiment.
Figure 32:
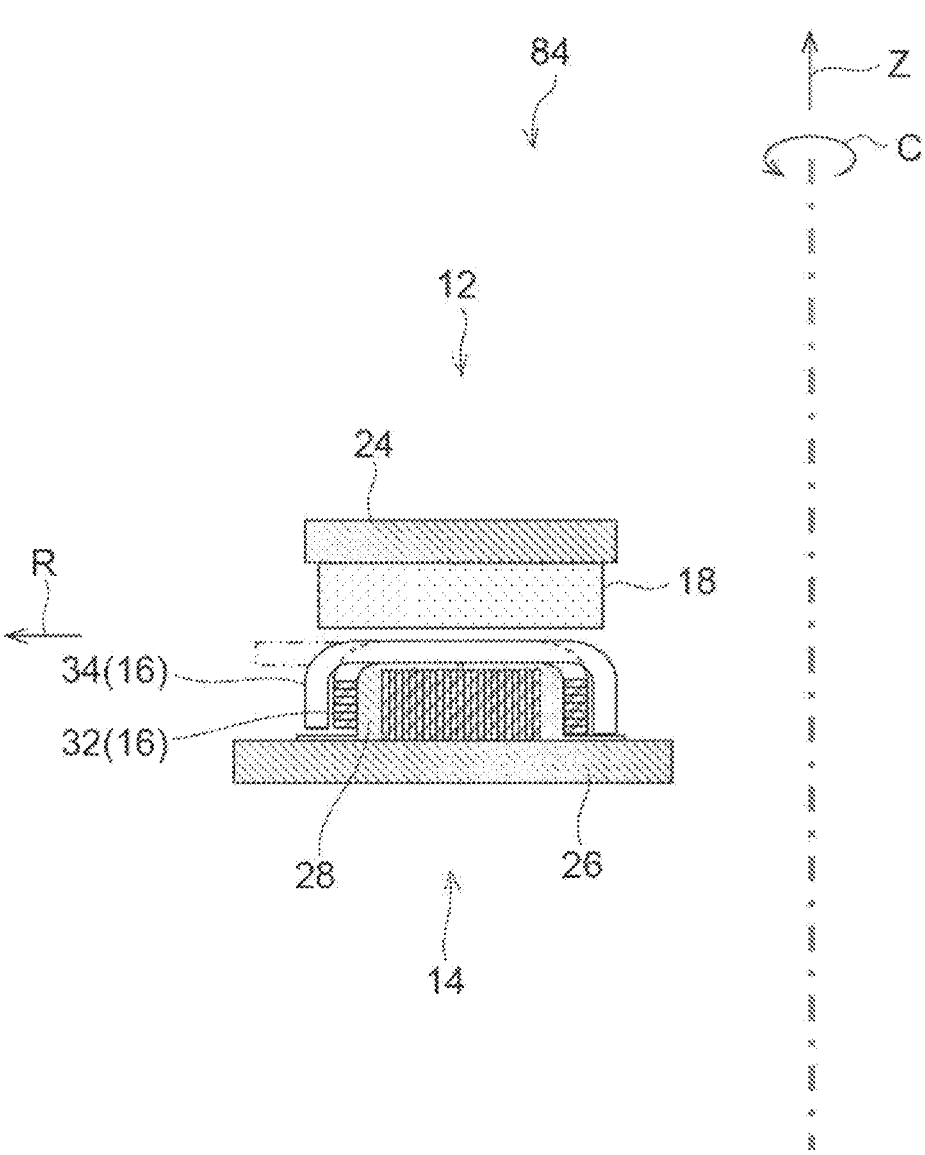
FIG. 32 is an enlarged transverse sectional view illustrating a part of a stator and a part of a rotor according to the fifteenth embodiment.

Specifically, FIG. 31 illustrates a motor 80 of the thirteenth embodiment. Only the inner-periphery cover member 28A of the insulator 28 included in the motor 80 is comprised of, as illustrated in FIG. 31, the base 50 and the soft-magnetic members 52 contained in the base 50. FIG. 32 illustrates a motor 82 of the fourteenth embodiment. Each of the first and second end-surface cover members 28B of the insulator 28 included in the motor 82 is only comprised of, as illustrated in FIG. 32, the base 50 and the soft-magnetic members 52 contained in the base 50. To selected components and parts of each of the motors 80 and 82 of the thirteenth and fourteenth embodiments, which are substantially identical to corresponding components and parts of the motor 10 of the first embodiment, the same or equivalent reference characters used by the corresponding components and parts of the motor 10 are assigned.

The rotor 12 and the stator 14 according to each of the embodiments are arranged to radially face one another, but the present disclosure is not limited to this arrangement. FIG. 32 illustrates a motor 84 of the fifteenth embodiment. The rotor 12 and the stator 14 of the motor 84 are, as illustrated in FIG. 32, arranged to axially face one another. To selected components and parts of each of the motor 84 of the fifteenth embodiment, which are substantially identical to corresponding components and parts of the motor 10 of the first embodiment, the same or equivalent reference characters used by the corresponding components and parts of the motor 10 are assigned.

In each of the embodiments, a component to which the magnets 18 are mounted serves as a rotor 12, and a component to which the coils 16 are mounted serves as a stator 14, but the present disclosure is not limited to the above configuration.

Specifically, the present disclosure can be applied to a configuration that a component to which the coils 16 are mounted serves as a rotor or an armature 12, and a component to which the magnets 18 are mounted serves as a stator 14. The present disclosure can be applied to a power generator including a rotor that is rotatable by external power.

Figure 33:
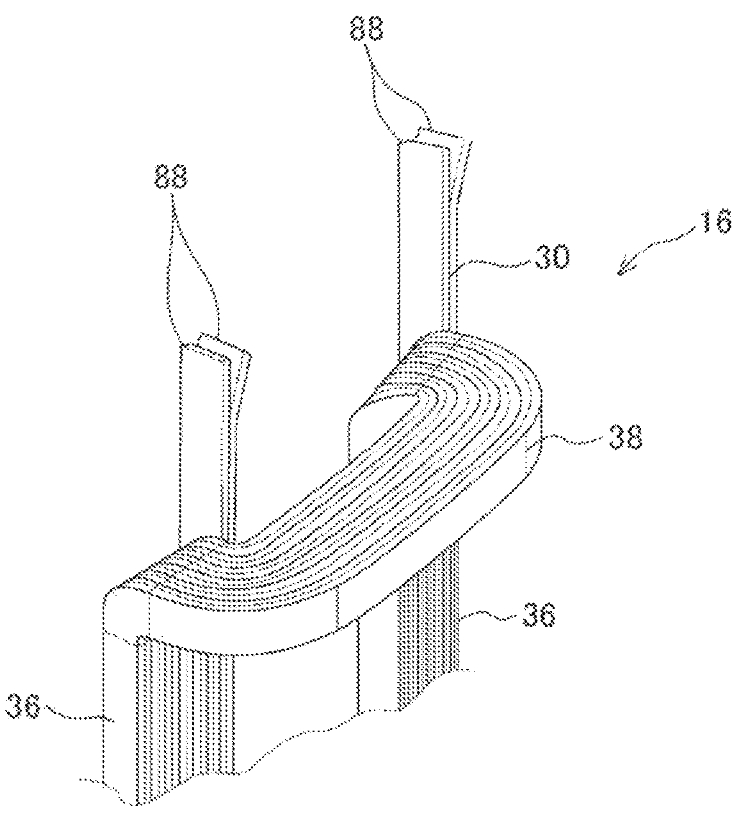
FIG. 33 is an enlarged perspective view of an example where each of first and second ends of a winding constituting a coil.
Figure 34:
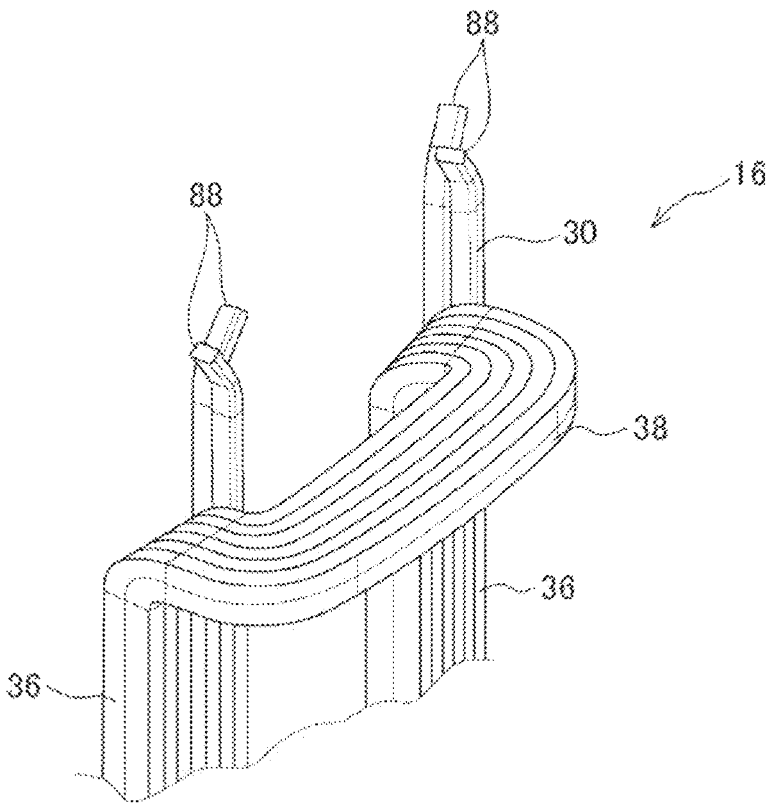
FIG. 34 is an enlarged perspective view of another example where each of first and second ends of a winding constituting a coil.
Figure 35:
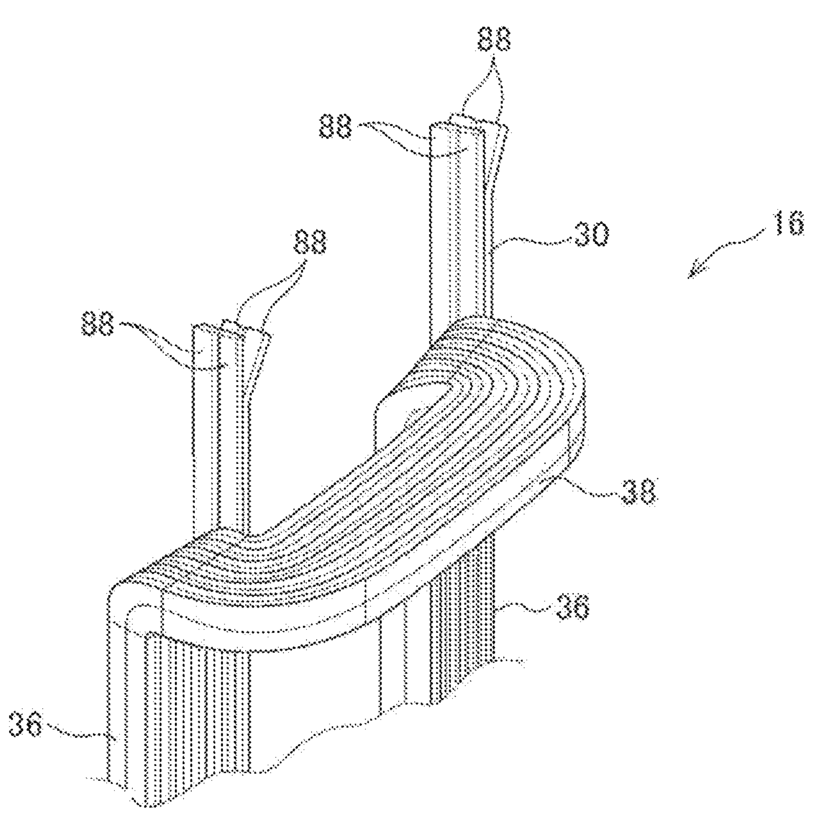
FIG. 35 is an enlarged perspective view of a further example where each of first and second ends of a winding constituting a coil.

Each coil 16 can be comprised of a winding 30 illustrated in any one of FIGS. 33 to 35. FIG. 33 illustrates an example where the winding 30 constituting each coil 16 is comprised of a pair of winding components 88 overlayed with one another in the second direction A2. FIG. 34 illustrates another example where the winding 30 constituting each coil 16 is comprised of a pair of winding components 88 overlayed with one another in the first direction A1. FIG. 35 illustrates a further example where the winding 30 constituting each coil 16 is comprised of four winding components 88 overlayed with one another in each of the first and second directions A1 and A2.

The present disclosure is not limited to the above embodiments, and therefore can be variously modified within the scope of the present disclosure. The configurations described in the present disclosure can be freely combined.

While the illustrative embodiments of the present disclosure have been described herein, the present disclosure is not limited to the embodiments and their configurations described herein, but includes any and all modifications and/or alternations as long as they are within a range of equivalency of the present disclosure. Additionally, (i) various combinations and embodiments and (ii) modified combinations and embodiments, which can be formed by adding one or more elements to the various combinations and embodiments are within the scope and technical idea of the present disclosure.

The invention claimed is:

1. An armature comprising:

an armature core having an annular shape; and a plurality of coils arranged along the armature core, each of the coils being a wound conductive winding, each of the coils comprising:

a pair of first and second facing portions disposed to be aligned in a circumferential direction with a predetermined interval therebetween, the first and second facing portions of each of the coils constituting intermediate portions of the corresponding one of the coils; and a pair of first and second coil end portions that link the first and second facing portions to each other; and an insulator arranged between the armature core and the coils, the insulator comprising:

a base comprised of an insulating material;

one or more soft-magnetic members each being comprised of a soft-magnetic material, the one or more soft-magnetic members being contained in the base; and a facing-portion intervention member arranged between the armature core and the first and second facing portions of the coils, wherein:

the one or more soft-magnetic members are contained at least in the facing-portion intervention member of the insulator;

the insulator further comprises at least one intervening protrusion that protrudes from the facing-portion intervention member toward a side of the coils, the at least one intervening protrusion being disposed to intervene between a corresponding selected adjacent pair of the first and second facing portions of adjacent coils of the plurality of coils; and the one or more soft-magnetic members are contained in the at least one intervening protrusion.

2. An armature comprising:

an armature core having an annular shape; and a plurality of coils arranged along the armature core, each of the coils being a wound conductive winding, each of the coils comprising:

a pair of first and second facing portions disposed to be aligned in a circumferential direction with a predetermined interval therebetween, the first and second facing portions of each of the coils constituting intermediate portions of the corresponding one of the coils; and a pair of first and second coil end portions that link the first and second facing portions to each other; and an insulator arranged between the armature core and the coils, the insulator comprising:

a base comprised of an insulating material;

one or more soft-magnetic members each being comprised of a soft-magnetic material, the one or more soft-magnetic members being contained in the base; and first and second coil-end intervention members, the first coil-end intervention member being arranged between the first coil end portion and the armature core, the second coil-end intervention member being arranged between the second coil end portion and the armature core, the one or more soft-magnetic members being contained at least in each of the first and second coil-end cover members, wherein:

each of the first and second coil-end intervention members has a facing surface facing the armature core;

the insulator further comprises:

a first void formed along the facing surface of the first coil-end intervention member, so that the first coil-end intervention member is separated from the armature core; and a second void formed along the facing surface of the second coil-end intervention member, so that the second coil-end intervention member is separated from the armature core;

the facing surface of each of the first and second coil-end intervention members has formed thereon a first edge defined as an inner periphery of the first void, the first edge being disposed to be in contact with the armature core; and the facing surface of each of the first and second coil-end intervention members has formed thereon a second edge defined as an outer periphery of the second void, the second edge being disposed to be in contact with the armature core.

3. The armature according to claim 1, wherein:

the insulator comprises first and second coil-end intervention members, each of the first and second coil-end intervention members having a coil-facing surface that faces at least one of the coils;

the coil-facing surface of each of the first and second coil-end intervention members is convexly curved outward to form a curved surface; and each of the coils is disposed along the curved surface of the coil-facing surface of each of the first and second coil-end intervention members.

4. The armature according to claim 2, wherein:

each of the first and second coil-end intervention members has a coil-facing surface that faces at least one of the coils; and the coil-facing surface of each of the first and second coil-end intervention members is convexly curved outward to form a curved surface; and each of the coils is disposed along the curved surface of the coil-facing surface of each of the first and second coil-end intervention members.

5. The armature according to claim 1, wherein:

the insulator includes a plurality of bobbin members, each of the coils being wound around the corresponding one of the bobbin members; and the one or more soft-magnetic members are contained in each of the bobbin members.

6. The armature according to claim 2, wherein:

the insulator includes a plurality of bobbin members, each of the coils being wound around the corresponding one of the bobbin members; and the one or more soft-magnetic members are contained in each of the bobbin members.

7. A motor comprising:

one of a stator and a rotor, the one of the stator and rotor comprising the armature according to claim 1; and the other of the stator and the rotor comprising a plurality of magnets arranged to radially or axially face the first and second facing portions of each of the coils.

8. A motor comprising:

one of a stator and a rotor, the one of the stator and rotor comprising the armature according to claim 2; and the other of the stator and the rotor comprising a plurality of magnets arranged to radially or axially face the first and second facing portions of each of the coils.

* * * * *